(12) United States Patent
Castillo et al.

(10) Patent No.: US 11,826,883 B2
(45) Date of Patent: Nov. 28, 2023

(54) ABRASIVE ARTICLE AND METHOD OF MAKING THE SAME

(71) Applicant: 3M INNOVATIVE PROPERTIES COMPANY, St. Paul, MN (US)

(72) Inventors: Maria C. Castillo, Merced, CA (US); Aaron K. Nienaber, Maplewood, MN (US); Joseph B. Eckel, Vadnais Heights, MN (US); Maiken Givot, St. Paul, MN (US)

(73) Assignee: Innovative Properties Company, St. Paul, MN (US)

( * ) Notice: Subject to any disclaimer, the term of this patent is extended or adjusted under 35 U.S.C. 154(b) by 1148 days.

(21) Appl. No.: 16/471,015

(22) PCT Filed: Dec. 15, 2017

(86) PCT No.: PCT/US2017/066733
§ 371 (c)(1),
(2) Date: Jun. 19, 2019

(87) PCT Pub. No.: WO2018/118695
PCT Pub. Date: Jun. 28, 2018

(65) Prior Publication Data
US 2020/0086458 A1 Mar. 19, 2020

Related U.S. Application Data

(60) Provisional application No. 62/437,869, filed on Dec. 22, 2016.

(51) Int. Cl.
*B24D 3/20* (2006.01)
*B24D 3/06* (2006.01)
(Continued)

(52) U.S. Cl.
CPC ............ *B24D 3/20* (2013.01); *B24D 3/06* (2013.01); *B24D 3/14* (2013.01); *B24D 7/14* (2013.01);
(Continued)

(58) Field of Classification Search
CPC ... B24D 3/20; B24D 3/06; B24D 3/14; B24D 7/14; B24D 18/0009; B24D 2203/00; C09K 3/1436
See application file for complete search history.

(56) References Cited

U.S. PATENT DOCUMENTS 4,680,199 A   7/1987   Vontell
8,142,531 B2  3/2012   Adefris
(Continued)

FOREIGN PATENT DOCUMENTS

CN   101745877    6/2010
WO   WO 2013-070576   5/2013
(Continued)

OTHER PUBLICATIONS

Supplementary EP Search Report, EP 17884551.7, dated Jul. 21, 2020 (11 pages).
(Continued)

*Primary Examiner* — Pegah Parvini
(74) *Attorney, Agent, or Firm* — Katherine M. Scholz

(57) ABSTRACT

Various embodiments disclosed relate to an abrasive article. The abrasive article includes a first major surface and an opposed second major surface. Each major surface contacts a peripheral side surface. A central axis extends through the first and second major surfaces. A first layer of abrasive particles is dispersed within the abrasive article according to a first predetermined pattern. Further a second layer of abrasive particles spaced apart from the first layer of abrasive particles and is dispersed within the abrasive article
(Continued)

along a according to a second predetermined pattern. A binder material retains the first and second layers of abrasive particles in the abrasive article. A portion of the binder material is located between the first and second layers of abrasive particles. That portion of the binder material is substantially continuous.

9 Claims, 13 Drawing Sheets

(51) Int. Cl.
B24D 3/14 (2006.01)
B24D 7/14 (2006.01)
B24D 18/00 (2006.01)
C09K 3/14 (2006.01)

(52) U.S. Cl.
CPC ........ B24D 18/0009 (2013.01); C09K 3/1436 (2013.01); *B24D 2203/00* (2013.01)

(56) References Cited

U.S. PATENT DOCUMENTS

| | | |
|---|---|---|
| 9,126,310 B2 | 9/2015 | Flock |
| 2007/0281592 A1 | 12/2007 | Benner |
| 2008/0289262 A1 | 11/2008 | Gao |
| 2010/0122498 A1 | 5/2010 | Chen |
| 2010/0248595 A1 | 9/2010 | Dinh-Ngoc |
| 2012/0167481 A1 | 7/2012 | Yener |
| 2012/0244792 A1 | 9/2012 | Jiang |
| 2014/0256238 A1* | 9/2014 | Van .................. B24D 5/14 451/548 |
| 2015/0251294 A1* | 9/2015 | Nie .................. B24D 3/32 451/544 |
| 2015/0267097 A1 | 9/2015 | Rosenflanz |
| 2016/0289521 A1* | 10/2016 | Colet ............. B24D 18/0009 |
| 2017/0252898 A1* | 9/2017 | Schillo-Armstrong .............. B24D 18/0009 |

FOREIGN PATENT DOCUMENTS

| | | | |
|---|---|---|---|
| WO | WO-2016/154130 | * 2/2016 | ........ B24D 3/02 |
| WO | WO 2016-044158 | 3/2016 | |
| WO | WO 2016-064726 | 4/2016 | |
| WO | WO 2017-172470 | 10/2017 | |

OTHER PUBLICATIONS

International Search report for PCT International Application No. PCT/US2017/066733 dated Apr. 13, 2018, 5 pages.

* cited by examiner

ABRASIVE ARTICLE AND METHOD OF MAKING THE SAME

CROSS REFERENCE TO RELATED APPLICATIONS

This application is a national stage filing under 35 U.S.C. 371 of PCT/US2017/066733, filed Dec. 15, 2017, which claims the benefit of U.S. Provisional Application No. 62/437,869, filed Dec. 22, 2016, the disclosure of which is incorporated by reference in its/their entirety herein.

BACKGROUND

Bonded abrasive articles have abrasive particles bound together via a bonding medium. The bonding medium can be an organic resin or an inorganic material such as a ceramic, glass (e.g., vitreous bonds), or metal. Examples of bonded abrasive articles include stones, hones, and abrasive wheels such as, for example, grinding wheels and cut-off wheels.

Grinding wheels can have various shapes and may be, for example, driven by a stationary-mounted motor such as, for example, a bench grinder, or a hand-operated portable grinder. Hand-operated portable grinders can be held at a slight angle relative to the workpiece surface, and may be used to grind, for example, welding beads, flash, gates, and risers of castings.

SUMMARY OF THE DISCLOSURE

Various embodiments disclosed relate to an abrasive article. The abrasive article includes a first major surface and an opposed second major surface. Each major surface contacts a peripheral side surface. A central axis extends through the first and second major surfaces. A first layer of abrasive particles is dispersed within the abrasive article according to a first predetermined pattern. A second layer of abrasive particles is spaced apart from the first layer of abrasive particles and is dispersed within the abrasive article according to a second predetermined pattern. A binder material retains the first and second layers of abrasive particles in the abrasive article. A portion of the binder material is located between the first and second layers of abrasive particles. That portion of the binder material is substantially continuous.

According to various embodiments of the present disclosure, a method of using an abrasive article includes contacting a surface and the abrasive article. The method further includes moving the abrasive article with respect to the surface to abrade or cut the surface.

According to further embodiments of the present disclosure, an apparatus for forming a layer of abrasive particles includes a housing formed from a first apparatus major surface, an opposed second apparatus, and a peripheral surface connecting the first apparatus major surface and the second apparatus major surface. The first apparatus major surface comprises a plurality of holes each adapted to receive an abrasive particle.

According to further embodiments of the present disclosure, a method of forming an abrasive article includes retaining a first plurality of abrasive particles within a first portion of the plurality of holes of an apparatus. The apparatus includes a housing formed from a first apparatus major surface, an opposed second apparatus, and a peripheral surface connecting the first apparatus major surface and the second apparatus major surface. The first apparatus major surface includes a plurality of holes each adapted to receive an abrasive particle. The apparatus is positioned within a mold. The first plurality of abrasive particles are released into the mold. A binder material is deposited in the mold. The mold is heated to produce the abrasive article.

There are several advantages associated with the abrasive article of this disclosure, at least some of which are unexpected. According to some embodiments of the present disclosure, layers of abrasive particles can be formed in an abrasive article to have a predetermined pattern. According to some embodiments, the predetermined pattern of the abrasive particles can be formed by placing them directly into the mold, without having to attach or retain the abrasive particles on a separate preform or layer, such as a scrim, which is incorporated into the abrasive article. According to some embodiments, abrasive articles with many patterned layers beyond a single patterned layer can be formed without requiring scrims. According to some embodiments, the predetermined pattern of the abrasive particles can result in the article having an increased cut rate due the arrangement of the abrasive particles, as compared to a corresponding abrasive article that is free of the abrasive particles in the predetermined pattern. According to some embodiments, the arrangement of the abrasive particles can be arranged in an optimized pattern leading to longer life, as compared to a corresponding abrasive article that is free of the abrasive particles in the predetermined pattern. Additionally, in some embodiments, the more uniform distribution of the abrasive particles in both two-dimensional (2D) and three-dimensional (3D) planes results in less abrasive particle being used for preferred performance, which can result in lower cost in forming the abrasive article. According to some embodiments, resin or binder coated abrasive particles can be arranged in predetermined patterns.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE DISCLOSURE

Figure 1:
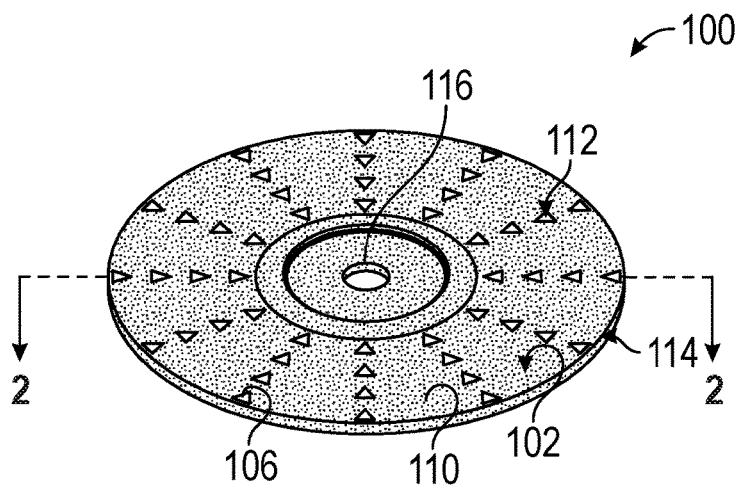
FIG. 1 is a perspective view of a depressed center grinding wheel.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Abrasive Article

Figure 2:
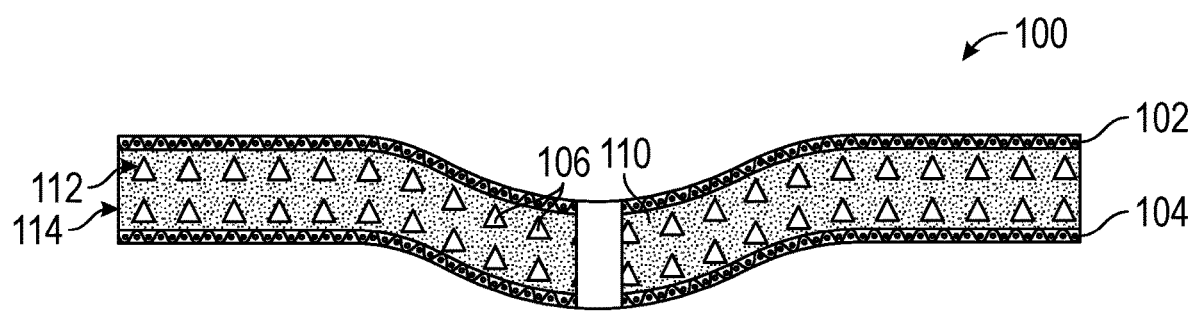
FIG. 2 is a sectional view of the abrasive article taken along line 2-2 of FIG. 1.
Figure 3:
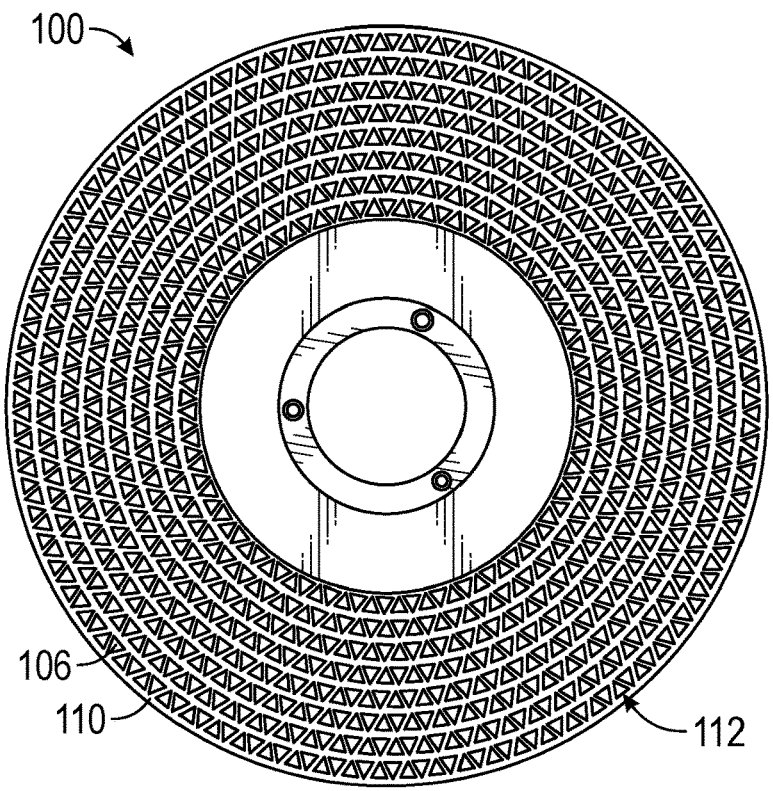
FIG. 3 is a plan view of an abrasive article having abrasive particles dispersed according to a predetermined pattern.
Figure 4:
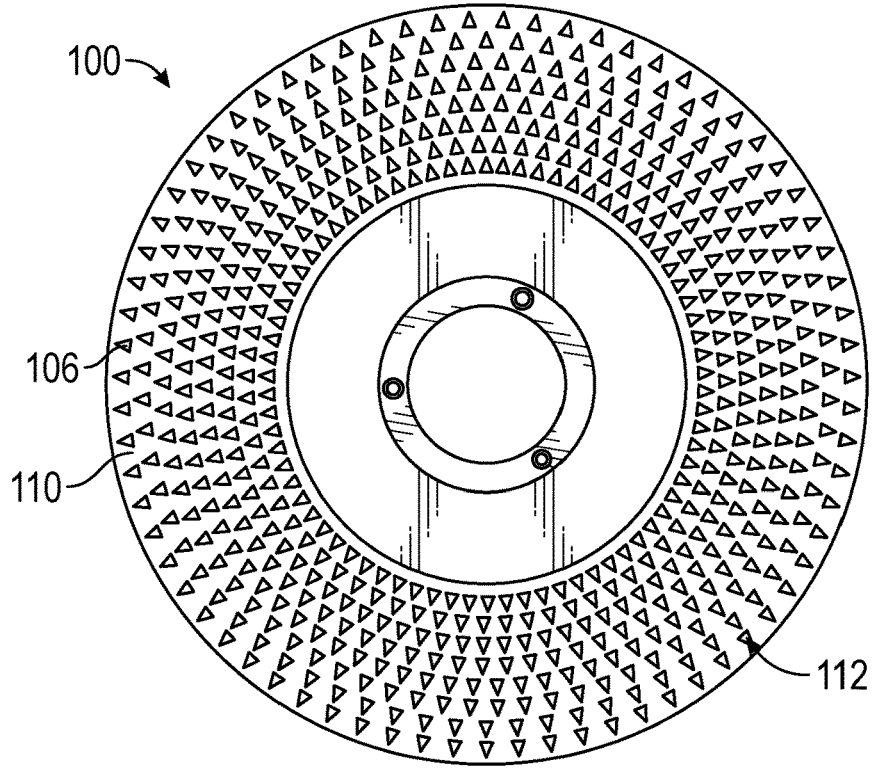
FIG. 4 is a plan view of another abrasive article having abrasive particles dispersed according to a predetermined pattern.
Figure 5:
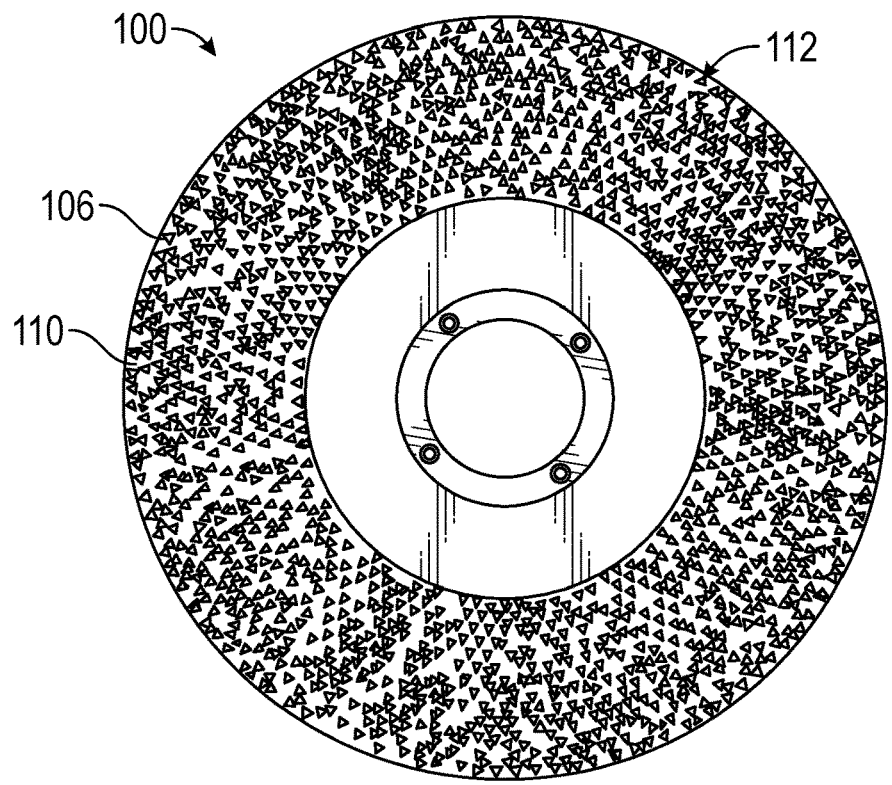
FIG. 5 is a plan view of another abrasive article having abrasive particles dispersed according to a predetermined pattern.
Figure 6:
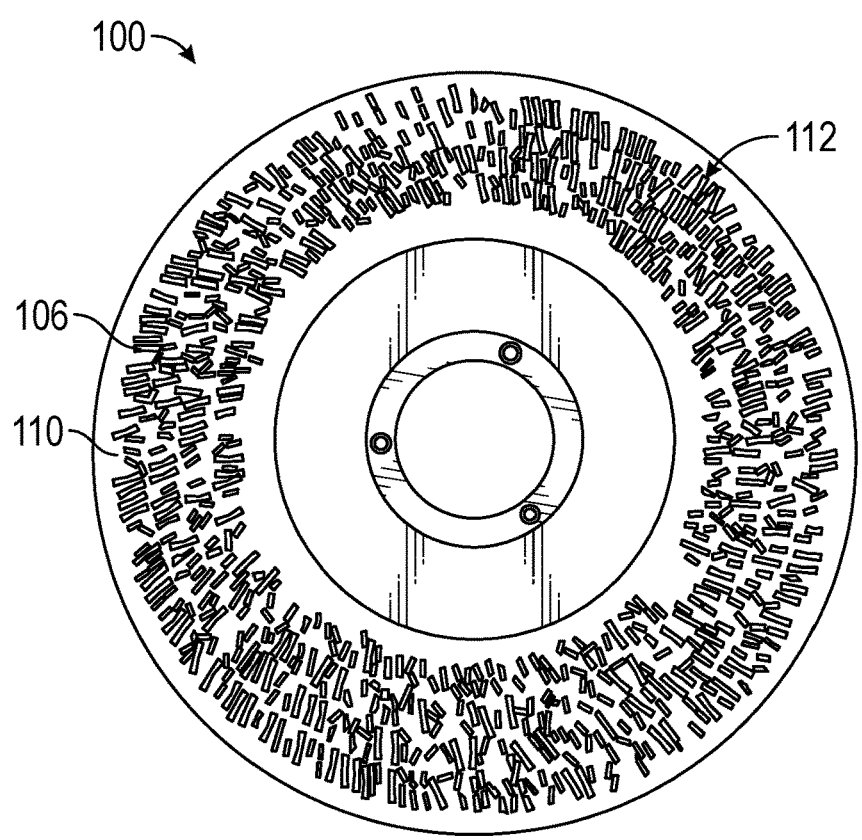
FIG. 6 is a plan view of another abrasive article having abrasive particles dispersed according to a predetermined pattern.

FIGS. 1 and 2 show an example of abrasive article 100. Specifically FIG. 1 is a perspective view of abrasive article 100 and FIG. 2 is a sectional view of abrasive article 100 taken along line 2-2 of FIG. 1. FIGS. 1 and 2 show many of the same features and are discussed concurrently. As depicted, abrasive article 100 is a depressed center grinding wheel. In other examples, the abrasive article can be a cut-off wheel, cutting wheel, a cut-and-grind wheel, a depressed center cut-off wheel, a reel grinding wheel, a mounted point, a tool grinding wheel, a roll grinding wheel, a hot-pressed grinding wheel, a face grinding wheel, a rail grinding wheel, a grinding cone, a grinding plug, a cup grinding wheel, a gear grinding wheel, a centerless grinding wheel, a cylindrical grinding wheel, an inner diameter grinding wheel, an outer diameter grinding wheel, or a double disk grinding wheel. The dimensions of the wheel can be any suitable size; for example the diameter can range from 2 cm to about 2000 cm.

Abrasive article 100 includes first major surface 102 and second major surface 104. The first major surface and the second major surface have a substantially circular profile. Central aperture 116 extends between the first major surface and the second major surface and can be used, for example, for attachment to a power-driven tool. In examples of other abrasive articles, the central aperture can be designed to only extend partially between the first and second major surfaces. Abrasive article 100 can be formed from a number of different components. For example, abrasive article 100 can include shaped abrasive particles 106, diluent smaller sized shaped abrasive particles, crushed abrasive particles, super abrasive particles (e.g., diamond or cubic boron nitride), filler particles, or a combination thereof. The particles present in abrasive article 100 are retained in binder 110. As described herein, the binder can be an organic resin, a vitreous binder, or a metallic binder. In some examples, the binder can include abrasive particles distributed therein.

The abrasive particles are arranged in layers. As shown in FIGS. 1 and 2, the abrasive article includes first layer of abrasive particles 112 and second layer of abrasive particles 114. The first layer of abrasive particles and the second layer of abrasive particles are spaced apart from one another with the binder located therebetween. Although two layers of abrasive particles are shown, the abrasive article can include additional layers of abrasive particles. For example, the abrasive article can include a third layer of abrasive particles adjacent to at least one of the first or second layers of abrasive particles.

At least a majority of the abrasive particles are not randomly distributed within the first, second, and third layers. Rather, the abrasive particles are distributed according to a predetermined pattern. For example, FIG. 1 shows a pattern where adjacent abrasive particles of the first layer of abrasive particles are directly aligned with each other in rows extending from the central aperture to the perimeter of the abrasive article. The adjacent abrasive particles are also directly aligned in concentric circles. Alternatively, adjacent abrasive particles can be staggered with respect to each other. Additional predetermined patterns of the abrasive particles are also within the scope of this disclosure. For example, the abrasive particles can be arranged in a pattern that forms a word or image. The abrasive particles can also be arranged in a pattern that forms an image when the abrasive article is rotated at a predetermined speed. In addition to, or instead of, the abrasive particles being arranged in a predetermined pattern, other particles such as filler particles can also be arranged in a predetermined pattern as described with respect to the abrasive particles.

Although only the predetermined pattern of the first layer of abrasive particles is shown, the predetermined pattern of the second, third, or any additional layer of abrasive particles can be substantially the same as the first layer of abrasive particles. Alternatively, at least one layer can have a different predetermined pattern than another layer. Additionally, in various multi-layer constructions, one or more layers of abrasive particles may not be formed to include a predetermined pattern of abrasive particles. For example, external layers of the abrasive article can include abrasive particles arranged in predetermined patterns, whereas an internal layer can include abrasive particles randomly distributed throughout the internal layer. Factors that drive the decision to select the predetermined pattern of each layer of abrasive particles can include the performance of each layer or the desired visual appearance of each layer.

By arranging the abrasive particles in a predetermined pattern, the majority, or each of, the abrasive particles of the first layer or third layer can form a portion of the first major surface. Correspondingly, the majority, or each of, the abrasive particles of the second layer or third layer can form a portion of the second major surface. Additionally, the abrasive particles of the first, second, or third layers can also form a portion of the peripheral surfaces. Thus, the abrasive particles of any layer can be directly exposed on the external surfaces of the abrasive article. This can allow the individual abrasive particles to be more visible.

FIGS. 3-6 show various examples of abrasive articles including abrasive particles exposed on an external surface and dispersed according to a predetermined pattern. As shown the abrasive articles include only a first layer of abrasive particles, but in other examples the abrasive article can include additional layers. In some examples, some abrasive particles can be a first color while others are a second color, thus providing a contrast between abrasive particles within the same layer. Additionally, directly exposing the abrasive particles on the external surfaces of the abrasive article can allow immediate contact between the abrasive particles and a substrate. Alternatively, the abrasive particles of at least one of the first layer, the second layer, and the third layer can be encapsulated by the binder material and thus not directly exposed on the external surface of the abrasive article. Thus, abrasive particles of the same or different color may not be exposed in some examples of the abrasive article.

The first layer, the second layer, and the third layer of abrasive particles can individually account for a different wt % of the abrasive article. For example, the wt % of each layer can be selected from a value ranging from about 2 wt % to about 50 wt % of the article, or from about 10 wt % to about 40 wt %, or from about 15 wt % to about 35 wt %, or from about 25 wt % to about 30 wt %, or less than about, equal to about, or greater than about 5 wt %, 10, 15, 20, 25, 30, 35, 40, or 45 wt %.

The abrasive particles in each layer do not have to be the same abrasive particle. For example, the first layer of abrasive particles can include at least a first plurality of abrasive particles and a second plurality of abrasive particles. The first plurality of abrasive particles and the second plurality of abrasive particles can individually range from about from about 10 wt % to about 100 wt % of the first layer of abrasive particles, or from about 20 wt % to about 90 wt %, or from about 30 wt % to about 80 wt %, or from about 40 wt % to about 60 wt %, or less than about, equal to about, or greater than about 15 wt %, 20, 25, 30, 35, 40, 45, 50, 55, 60, 65, 70, 75, 80, 85, 90, or 95 wt %.

The abrasive particles of the first and second pluralities of particles can differ in respect to the shape, size, or type of abrasive particle. For example, the first plurality of abrasive particles can be shaped abrasive particles whereas the second plurality of abrasive particles can be crushed abrasive particles. In other examples, the first and second pluralities of abrasive particles can be a same type of abrasive particle (e.g., a shaped abrasive particle) but may differ in size. In further examples, the first and second pluralities of particles may be different types of abrasive particles but may have substantially the same size. The second, third, and any additional layers of abrasive articles can include pluralities of abrasive particles that are similar to those of the first layer of abrasive particles.

Figure 7A:
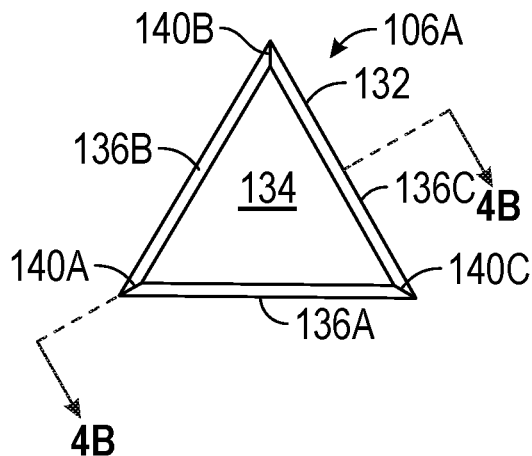
FIG. 7A is a plan view of a shaped abrasive particle having a triangular base.
Figure 7B:
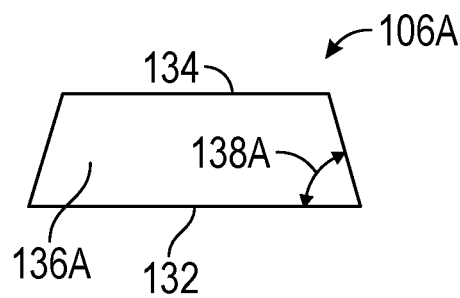
FIG. 7B is a sectional view of the shaped abrasive particle of FIG. 4A taken along line 4B-4B.

As described herein, the abrasive particles can be shaped or crushed abrasive particles. FIGS. 7A-7H depict various examples of shaped abrasive particles 106 that can be included in the abrasive article. As shown in FIGS. 7A and 7B, shaped abrasive particle 106A includes a truncated regular triangular pyramid bounded by a triangular base 132, a triangular top, 134 and plurality of sloping sides 136A, 136B, 136C connecting triangular base 132 (shown as equilateral) and triangular top 134. Slope angle 138A is the dihedral angle formed by the intersection of side 136A with triangular base 132. Similarly, slope angles 138B and 138C (both not shown) correspond to the dihedral angles formed by the respective intersections of sides 136B and 136C with triangular base 132. In the case of shaped abrasive particle 106, all of the slope angles have equal value. In some embodiments, side edges 140A, 140B, and 140C have an average radius of curvature of less than 50 micrometers, although this is not a requirement.

In the embodiment shown in FIGS. 7A and 7B, sides 136A, 136B, and 136C have equal dimensions and form dihedral angles with the triangular base 132 of about 82 degrees (corresponding to a slope angle of 82 degrees). However, it will be recognized that other dihedral angles (including 90 degrees) may also be used. For example, the dihedral angle between the base and each of the sides may independently range from 45 to 90 degrees (for example, from 70 to 90 degrees, or from 75 to 85 degrees).

Figure 7C:
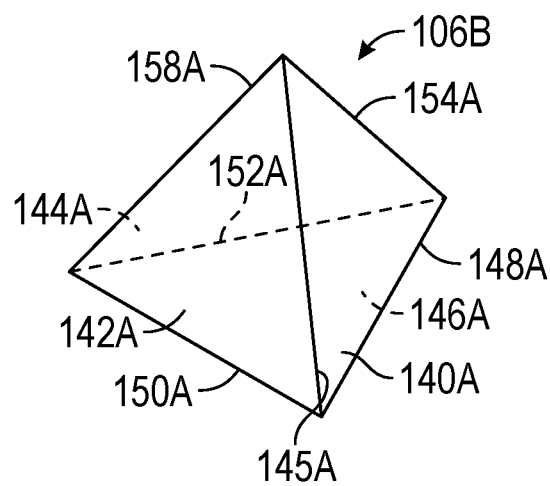
FIGS. 7C-7F are perspective views of various shaped abrasive particles having a tetrahedral shape.

As shown in FIG. 7C, shaped abrasive particle 106B may be shaped as a regular tetrahedron. Accordingly, shaped abrasive particle 106B has four congruent planar major sides 140A. 142A, 144A, and 146A joined by six common edges 148A, 150A, 152A, 154A, 156A and 158A.

Figure 7D:
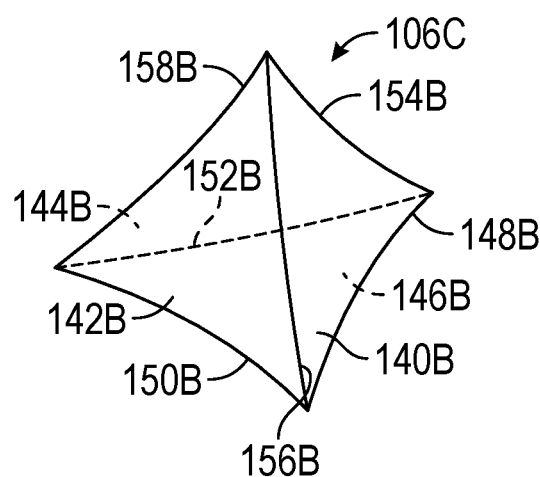
Figure 7E:
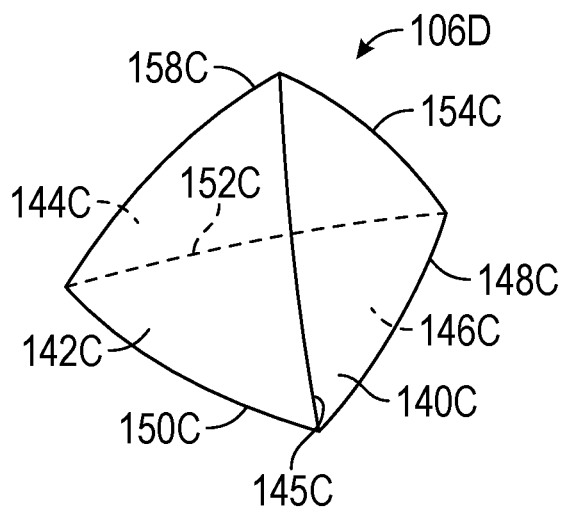

In other embodiments, shaped abrasive particles 106 may be shaped as shown in FIG. 7D. As shown, shaped abrasive particle 106C has four concave major sides 140B, 142B, 144B, and 146B joined by six common edges 148B, 150B, 152B, 154B, 156B, and 158B. In other embodiments, shaped abrasive particles 106 may be shaped as shown in FIG. 7E. Accordingly, shaped abrasive particle 106D has four convex major sides 140C, 142C, 144C, and 146C joined by six common edges 148C, 150C, 152C, 154C, 156C, and 158C.

Figure 7F:
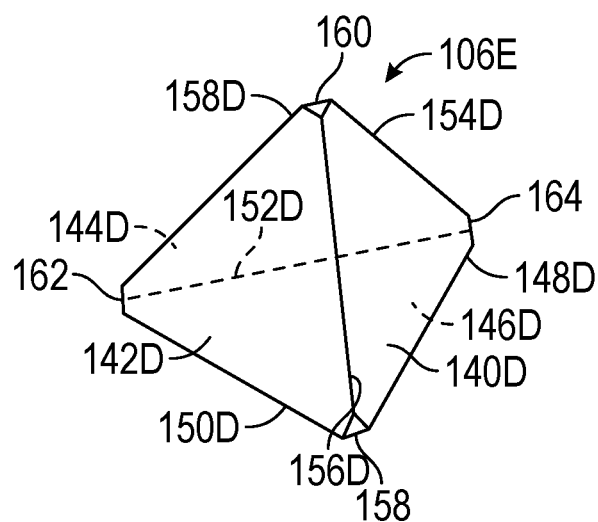

In other embodiments, shaped abrasive particles 106 may be shaped as a truncated tetrahedron as shown in FIG. 7F. Accordingly, shaped abrasive particle 106E has four planar major sides 140D, 142D, 144D, and 146D joined by six common edges 148D, 150D, 152D, 154D, 156D and 158D of substantially the same length. Particle 106E further includes vertexes 158, 160, 162, and 164.

Figure 7G:
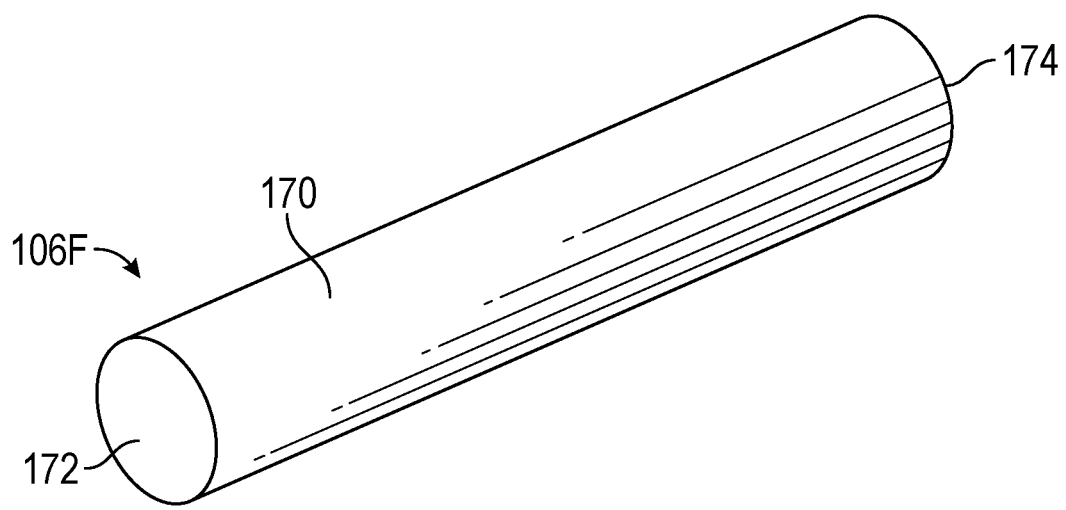
FIG. 7G is a perspective view of a shaped abrasive particle having a cylindrical shape.

In other embodiments, shaped abrasive particles may be shaped as a cylinder as shown in FIG. 7G. FIG. 7G is a perspective view showing shaped abrasive particle 106F. Shaped abrasive particle 106F includes a cylindrically shaped body 170 extending between circular first and second ends 172 and 174.

Figure 7H:
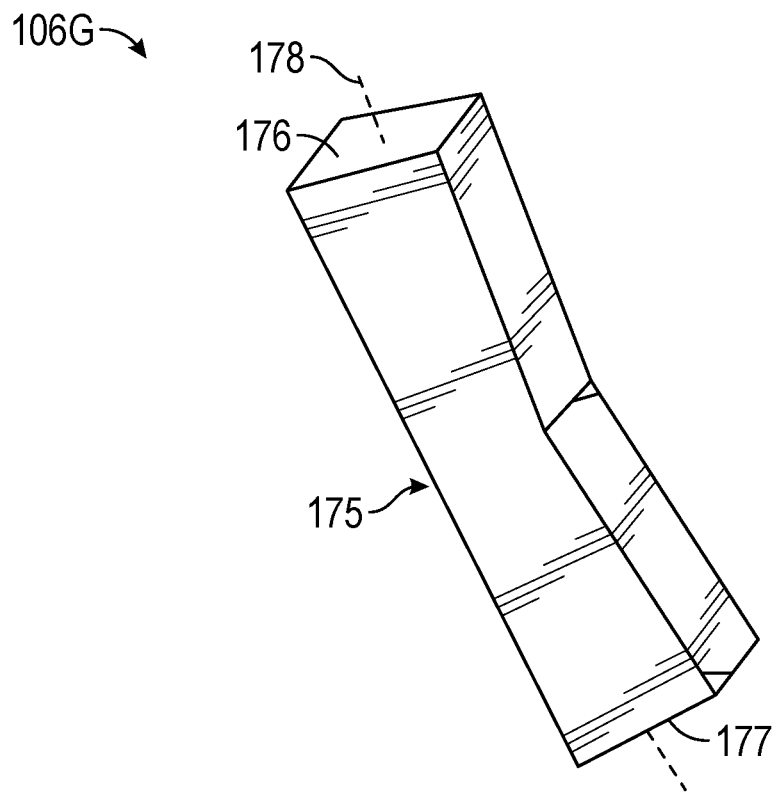
FIG. 7H is a perspective view of a shaped abrasive particle having a variable cross-sectional area.

In other embodiments, shaped abrasive particles may be shaped to have a bowtie shape as shown in FIG. 7H. FIG. 7H is a perspective view of abrasive particle 106G. Abrasive particle 106G includes elongated body 175, which is defined between opposed first end 176 and second end 177. An aspect ratio of a length to a width of abrasive particle 106G can range from about 3:1 to about 6:1, or from about 4:1 to about 5:1.

The elongated body includes axis 178, which extends through the middle of the elongated body, the first end, and the second end. As illustrated, the axis is a non-orthogonal axis, but m other examples the axis can be a straight axis. As illustrated, each of the first end and the second end define a substantially planar surface. Both the first end and the second end are oriented at an angle relative to the axis that is less than 90 degrees, and each end is non-parallel with respect to each other. In other examples only one of the first and second ends are oriented at an angle relative to the axis that is less than 90 degrees. The first end and the second end have respective first and second cross-sectional areas. As illustrated, the first and second cross-sectional areas are substantially the same. But in other embodiments, the first and second cross-sectional areas can be different. The elongated body tapers inward from the first end and the second end to a mid-point having a cross-sectional area that is smaller than that of the first or second ends.

Figure 7I:
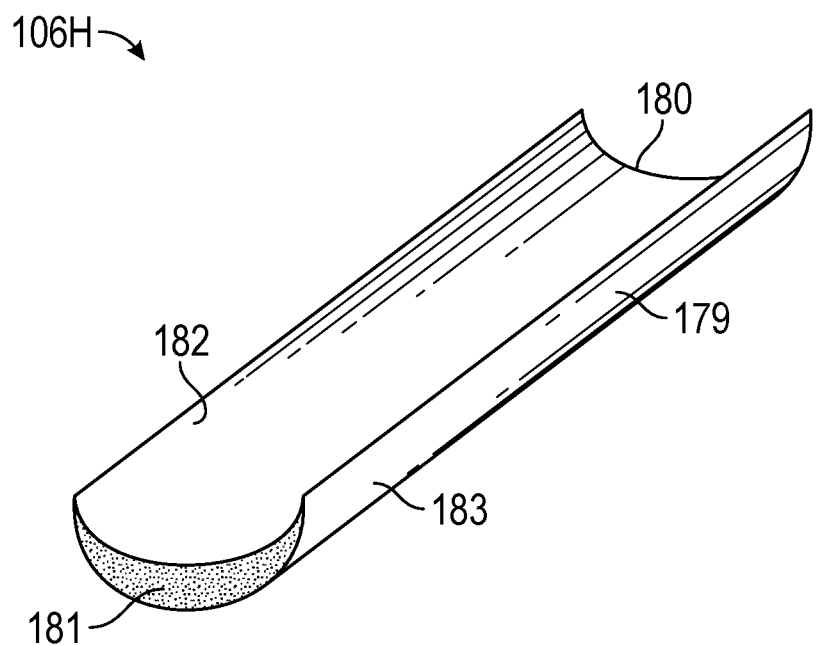
FIG. 7I is a perspective view of a shaped abrasive particle having an elongated shape.

In other examples, as shown in FIG. 7I, shaped abrasive particle 106H has an elongate shaped ceramic body 179 having opposed first and second ends 180, 181 joined to each other by longitudinal sidewalls 182, 183. Longitudinal sidewall 182 is concave along its length. First and second ends 180, 181 are fractured surfaces.

Figure 7J:
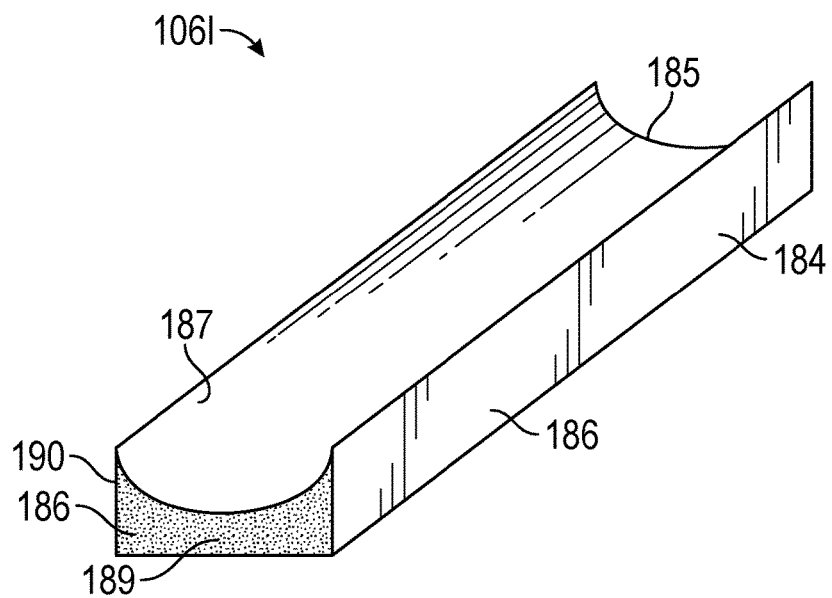
FIG. 7J is a perspective view of another shaped abrasive particle having an elongated shape.

In other examples, as shown in FIG. 7J, shaped abrasive particle 106I has an elongate shaped ceramic body 184 having opposed first and second ends 185, 186 joined to each other by longitudinal sidewalls 187, 188, 189, 190. Longitudinal sidewall 187 is concave along its length. First and second ends 185, 186 are fractured surfaces.

Shaped abrasive particles 106F-I have an aspect ratio of at least 2. In some embodiments, shaped abrasive particles 106F-I have an aspect ratio of at least 4, at least 6, or even at least 10.

The shaped abrasive particles 106A-106G described herein can be made using tools (e.g., molds) cut using diamond tooling, which provides higher feature definition than other fabrication alternatives such as, for example, stamping or punching. The cavities in the tool surface can have planar faces that meet along sharp edges and form the sides and top of a truncated pyramid. The resultant shaped abrasive particles have a respective nominal average shape that corresponds to the shape of cavities (e.g., truncated pyramids) in the tool surface; however, variations (e.g., random variations) from the nominal average shape may occur during manufacture, and shaped abrasive particles exhibiting such variations are included within the definition of shaped abrasive particles as used herein.

As used herein in referring to the size of shaped abrasive particles, the term "length" refers to the maximum dimension of a shaped abrasive particle. The term "width" refers to the maximum dimension of the shaped abrasive particle that is perpendicular to the length. The terms "thickness" or "height" refer to the dimension of the shaped abrasive particle that is perpendicular to the length and width.

The shaped abrasive particles can be selected to have a length in a range from 0.001 mm to 26 mm, or from 0.1 mm to 10 mm, or from 0.5 mm to 5 mm, although other lengths may also be used. In some embodiments, the length may be expressed as a fraction of the thickness of the abrasive article in which it is contained. For example, the shaped abrasive particle may have a length greater than half the thickness of the abrasive article. In some embodiments, the length may be greater than the thickness of the abrasive article.

The shaped abrasive particles can be selected to have a width in a range of from 0.001 mm to 26 mm, or from 0.1 mm to 10 mm, or from 0.5 mm to 5 mm, although other lengths may also be used. The shaped abrasive particles can be selected to have a thickness in a range from 0.005 mm to 1.6 mm, or from 0.2 to 1.2 mm. In some embodiments, the shaped abrasive particles may have an aspect ratio (length to thickness) of at least 2, 3, 4, 5, 6, or more.

Surface coatings on the shaped abrasive particles may be used to improve the adhesion between the shaped abrasive particles and a binder material in abrasive articles, or can be used to aid in electrostatic deposition of the shaped abrasive particles. Additionally, the surface coating may prevent the shaped abrasive particle from capping. Capping is the term to describe the phenomenon where metal particles from the workpiece being abraded become welded to the tops of the abrasive particles. Surface coatings to perform the above functions are known to those of skill in the art. The shaped abrasive particles can be coated with the resin or bond of the binder layer prior to being formed into the predetermined pattern in the abrasive article. The abrasive particles can be partially or entirely coated with resin or bonding material.

According to the present disclosure, the abrasive article may further include crushed abrasive particles (e.g., abrasive particles not resulting from breakage of the shaped abrasive particles) corresponding to an abrasive industry specified nominal grade or combination of nominal grades. If present, the crushed abrasive particles can be of finer size grade, or grades (e.g., if a plurality of size grades are used), than the shaped abrasive particles, although this is not a requirement.

The abrasive article may further include crushed abrasive particles corresponding to an abrasive industry specified nominal grade or combination of nominal grades in first layer 102. An example of such abrasive particles are powder derived or sol-gel derived ceramic aluminum oxide particles (referred to as 3M ceramic abrasive grains). The crushed abrasive particles can be of finer size grade, or grades (e.g., if a plurality of size grades are used), than the crushed abrasive particles in second layer 104, although this is not a requirement.

Examples of suitable crushed abrasive particles include, for example, crushed particles of fused aluminum oxide, sintered aluminum oxide, heat treated aluminum oxide, white fused aluminum oxide, black silicon carbide, green silicon carbide, titanium diboride, boron carbide, tungsten carbide, titanium carbide, diamond, cubic boron nitride, garnet, fused alumina zirconia, iron oxide, chromia, ceria, zirconia, titania, tin oxide, silica (such as quartz, glass beads, glass bubbles and glass fibers) silicates (such as talc, clays (e.g., montmorillonite), feldspar, mica, calcium silicate, calcium metasilicate, sodium aluminosilicate, sodium silicate), flint, and emery.

Abrasive particles used in the abrasive article of the present disclosure, whether crushed abrasive particles or shaped abrasive particles, may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24. ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, FEPA P1200; FEPA F8, FEPA F12, FEPA F16, and FEPA F24; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360. JIS 400. JIS 400, JIS 600, JIS 800, JIS 1000, JIS 1500, JIS 2500, JIS 4000, JIS 6000, JIS 8000, and JIS 10,000. More commonly, crushed aluminum oxide particles and non-seeded sol-gel derived alumina-based abrasive particles are independently sized to ANSI 60 and 80, or FEPA F36, F46, F54 and F60 or FEPA P60 and P80 grading standards.

Alternatively, the abrasive particles (e.g., crushed abrasive particles and/or shaped abrasive particles) can be graded to a nominal screened grade using U.S.A. Standard Test Sieves conforming to ASTM E-11 "Standard Specification for Wire Cloth and Sieves for Testing Purposes." ASTM E-11 prescribes the requirements for the design and construction of testing sieves using a medium of woven wire cloth mounted in a frame for the classification of materials according to a designated particle size. A designation may be represented as −18+20 meaning that the shaped abrasive particles pass through a test sieve meeting ASTM E-11 specifications for the number 18 sieve and are retained on a test sieve meeting ASTM E-11 specifications for the number 20 sieve. In one embodiment, the shaped abrasive particles have a particle size such that most of the particles pass through an 18 mesh test sieve and can be retained on a 20, 25, 30, 35, 40, 45, or 50 mesh test sieve. In various embodiments, the shaped abrasive particles can have a nominal screened grade of: −18+20, −201+25, −25+30, −30+35, −35+40, 5−40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100.

The abrasive particles may be treated with a coupling agent (e.g., an organosilane coupling agent) to enhance adhesion of the abrasive particles to the binder. The abrasive particles may be treated before combining them with the binder material or they may be surface treated in situ by including a coupling agent to the binder material.

Examples of the abrasive particles can be made according to a multistep process. Briefly, the method includes the steps of making either a seeded or non-seeded sol-gel alpha alumina precursor dispersion that can be converted into alpha alumina; filling one or more mold cavities having the desired outer shape of the shaped abrasive particle with the sol-gel, drying the sol-gel to form precursor shaped abrasive particles; removing the precursor shaped abrasive particles from the mold cavities; calcining the precursor shaped abrasive particles to form calcined, precursor shaped abrasive particles, and then sintering the calcined, precursor shaped abrasive particles to form shaped abrasive particles. The process will now be described in greater detail.

The method includes a step involving providing either a seeded or non-seeded dispersion of an alpha alumina precursor that can be converted into alpha alumina. The alpha alumina precursor dispersion often includes a liquid that is a volatile component. In one embodiment, the volatile component is water. The dispersion should include a sufficient amount of liquid for the viscosity of the dispersion to be sufficiently low to enable filling mold cavities and replicating the mold surfaces, but not so much liquid as to cause subsequent removal of the liquid from the mold cavity to be prohibitively expensive. In one embodiment, the alpha alumina precursor dispersion includes from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the alpha alumina precursor dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trade designations "DISPERAL," and "DISPAL," both available from Sasol North America, Inc., Houston, Tex., or "HiQ-40" available from BASF Corporation, Florham Park, N.J. These aluminum oxide monohydrates are relatively pure; that is, they include relatively little, if any, hydrate phases other than monohydrates, and have a high surface area.

The physical properties of the resulting shaped abrasive particles may generally depend upon the type of material used in the alpha alumina precursor dispersion. In one embodiment, the alpha alumina precursor dispersion is in a gel state. As used herein, a "gel" is a three dimensional network of solids dispersed in a liquid.

The alpha alumina precursor dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts and water soluble salts. They can include a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof.

The particular concentrations of these additives that can be present in the alpha alumina precursor dispersion can be varied based on skill in the art. The introduction of a modifying additive or precursor of a modifying additive can cause the alpha alumina precursor dispersion to gel. The alpha alumina precursor dispersion can also be induced to gel by application of heat over a period of time. The alpha alumina precursor dispersion can also contain a nucleating agent (seeding) to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina.

A peptizing agent can be added to the alpha alumina precursor dispersion to produce a more stable hydrosol or colloidal alpha alumina precursor dispersion. Suitable peptizing agents are monoprotic acids or acid compounds such as acetic acid, hydrochloric acid, formic acid, and nitric acid. Multiprotic acids can also be used but they can rapidly gel the alpha alumina precursor dispersion, making it difficult to handle or to introduce additional components thereto. Some commercial sources of boehmite contain an acid titer (such as absorbed formic or nitric acid) that will assist in forming a stable alpha alumina precursor dispersion. The alpha alumina precursor dispersion can be formed by any suitable means, such as, for example, by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired. The alpha alumina abrasive particles may contain silica and iron oxide.

The process includes a step involving providing a mold having at least one mold cavity, and preferably a plurality of cavities. The mold can have a generally planar bottom surface and a plurality of mold cavities. The plurality of cavities can be formed in a production tool. The production tool can be a belt, a sheet, a continuous web, a coating roll such as a rotogravure roll, a sleeve mounted on a coating roll, or die. In one embodiment, the production tool include polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the sol-gel while drying, such as the surfaces of the plurality of cavities, includes polymeric or thermoplastic materials, and other portions of the tooling can be made from other materials. A suitable polymeric coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal (e.g., nickel) and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool, thereby limiting its life.

Access to cavities can be from an opening in the top surface or bottom surface of the mold. In some instances, the cavities can extend for the entire thickness of the mold. Alternatively, the cavities can extend only for a portion of the thickness of the mold. In one embodiment, the top surface is substantially parallel to the bottom surface of the mold with the cavities having a substantially uniform depth. At least one side of the mold, that is, the side in which the cavities are formed, can remain exposed to the surrounding atmosphere during the step in which the volatile component is removed.

The cavities have a specified three-dimensional shape to make the shaped abrasive particles. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The process includes a step involving filling the cavities in the mold with the alpha alumina precursor dispersion (e.g., by a conventional technique). In some embodiments, a knife roll coater or vacuum slot die coater can be used. A mold release can be used to aid in removing the particles from the mold if desired. Suitable mold release agents can include oils such as peanut oil or mineral oil, fish oil, silicones, polytetrafluoroethylene, zinc stearate, and graphite. In general, a mold release agent such as peanut oil, in a liquid, such as water or alcohol, is applied to the surfaces of the production tooling in contact with the sol-gel such that between about 0.1 mg/in$^2$ (0.02 mg/cm$^2$) to about 3.0 mg/in$^2$ 0.46 mg/cm$^2$), or between about 0.1 mg/in$^2$ (0.02 mg/cm$^2$) to about 5.0 mg/in$^2$ (0.78 mg/cm$^2$) of the mold release agent is present per unit area of the mold when a mold release is desired. In some embodiments, the top surface of the mold is coated with the alpha alumina precursor dispersion. The alpha alumina precursor dispersion can be pumped onto the top surface.

A scraper or leveler bar can be used to force the alpha alumina precursor dispersion fully into the cavity of the mold. The remaining portion of the alpha alumina precursor dispersion that does not enter the cavity can be removed from the top surface of the mold and recycled. In some embodiments, a small portion of the alpha alumina precursor dispersion can remain on the top surface and in other embodiments the top surface is substantially free of the dispersion. The pressure applied by the scraper or leveler bar can be less than 100 psi (0.7 MPa), less than 50 psi (0.3 MPa), or even less than 10 psi (69 kPa). In some embodiments, no exposed surface of the alpha alumina precursor dispersion extends substantially beyond the top surface to ensure uniformity in thickness of the resulting shaped abrasive particles.

The process includes a step involving removing the volatile component to dry the dispersion. In some embodiments, removal of the volatile component by evaporation occurs at temperatures above the boiling point of the volatile component. An upper limit to the drying temperature often depends on the material from which the mold is made. For polypropylene tooling, the temperature should be less than the melting point of the plastic. In one embodiment, for a water dispersion of between about 40 to 50 percent solids and a polypropylene mold, the drying temperatures can be between about 90° C. to about 165° C. or between about 105° C. to about 150° C., or between about 105° C. to about 120° C. Higher temperatures can lead to improved production speeds but can also lead to degradation of the polypropylene tooling, thereby limiting its useful life as a mold.

The process includes a step involving removing resultant precursor shaped abrasive particles from the mold cavities. The precursor shaped abrasive particles can be removed from the cavities by using the following processes alone or in combination on the mold: gravity, vibration, ultrasonic vibration, vacuum, or pressurized air to remove the particles from the mold cavities.

The precursor abrasive particles can be further dried outside of the mold. If the alpha alumina precursor dispersion is dried to the desired level in the mold, this additional drying step is not necessary. However, in some instances, it may be economical to employ this additional drying step to minimize the time that the alpha alumina precursor dispersion resides in the mold. The precursor shaped abrasive particles can be dried from 10 to 480 minutes, or from 120 to 400 minutes, at a temperature from 50° C. to 160° C., or at 120° C. to 150° C.

The process includes a step involving calcining the precursor shaped abrasive particles. During calcining, essentially all of the volatile material is removed, and the various components that were present in the alpha alumina precursor dispersion are transformed into metal oxides. The precursor shaped abrasive particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor shaped abrasive particles. Then the precursor shaped abrasive particles are pre-fired again.

The process includes a step involving sintering the calcined, precursor shaped abrasive particles to form alpha alumina particles. Prior to sintering, the calcined, precursor shaped abrasive particles are not completely densified and thus lack the desired hardness to be used as shaped abrasive particles. Sintering takes place by heating the calcined, precursor shaped abrasive particles to a temperature of from 1,000° C. to 1,650° C. and maintaining them within this temperature range until substantially all of the alpha alumina monohydrate (or equivalent) is converted to alpha alumina and the porosity is reduced to less than 15 percent by volume. The length of time to which the calcined, precursor shaped abrasive particles can be exposed to the sintering temperature to achieve this level of conversion depends upon various factors but usually from five seconds to 48 hours is suitable.

In another embodiment, the duration for the sintering step ranges from one minute to 90 minutes. After sintering, the shaped abrasive particles can have a Vickers hardness of 10 GPa, 16 GPa, 18 GPa, 20 GPa, or greater.

Other steps can be used to modify the described process such as, for example, rapidly heating the material from the calcining temperature to the sintering temperature and centrifuging the alpha alumina precursor dispersion to remove sludge and/or waste. Moreover, the process can be modified by combining two or more of the process steps if desired.

In other examples the shaped abrasive particle can be formed through sintering as opposed to a sol-gel process. Briefly stated, a shaped precursor particle is sintered to form a shaped abrasive particle. The length of time that the particle is sintered can vary depending on the desired properties of the final shaped abrasive particle. This process is further described in U.S. Publ. Patent Appln. No. 2015/0267097 A1 (Rosenflanz et al.).

Shaped abrasive particles 106H and 106I can be formed by pouring an abrasive material into a mold having at least one elongated channel. The abrasive material is then dried or cured to form a solid abrasive particle precursor. The precursor is then fractured to produce abrasive particles. The sizes of the abrasive particles may be random or the abrasive particles can be fractured to produce abrasive particles of a desired size. Additional details may be found in U.S. Pat. Ser. No. 66/316,854 (Erickson).

Figure 8:
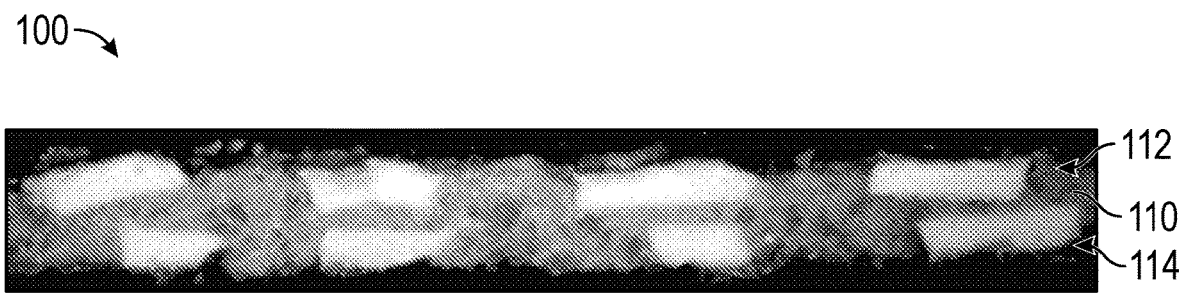
FIG. 8 is a sectional view of an abrasive article.

As stated herein, the binder material retains the first, second, and, if present, third layers of abrasive particles. A portion of the binder material is located between each layer of abrasive particles. For example, a portion of the binder material is located between the first and second layers of abrasive particles. The portion of binder can range from about 50 wt % to about 100 wt % of the binder in the abrasive article, or from about 70 wt % to about 100 wt % or less than about, equal to about, or greater than about 55 wt %, 60, 65, 70, 75, 80, 85, 90, or 95 wt %. The portion of the binder material located between layers of abrasive particles is continuous. That is, the portion of the binder is substantially monolithic and free of striations such as grooves, cracks, scratches, or channels. Although certain particles such as filler particles can be present between the layers of abrasive particles, these particles do not break the continuity of the binder layer. That is there is a continuous path around the particle defined by the binder. The path can be a straight or curved path. The continuity of the binder layer is shown in FIG. 8, which is a cross sectional view of an abrasive article having two adjacent abrasive particle layers with a continuous binder layer disposed between the abrasive particle layers.

In addition to being free of striations and the like, the abrasive article can also be free of any reinforcing layer disposed between adjacent layers of abrasive particles. For example, the abrasive article can be free of a fiberglass, or otherwise woven, scrim material. Thus, the continuity of the portion of the binder is not disrupted by a reinforcing layer. However, in some examples optional chopped fibers may be included in the binder layer without disrupting the continuity of the binder layer. That is, the binder material is able to encapsulate the chopped fiber.

As described herein the binder material can be an organic binder material, a vitreous binder material, or a metallic binder material.

Organic binders, as described herein, can be included in the abrasive article in amounts ranging from about 5 wt % to about 50 wt % of the total weight of the abrasive article, or from about 10 wt % to about 25 wt %, or from about 15 wt % to about 24 wt %, or less than about, equal to about, or greater than about, 10 wt %, 15, 20, 25, 30, 35, 40, or 45 wt %.

Suitable organic binders are those that can be cured (e.g., polymerized and/or crosslinked) to form useful organic binders. These binders include, for example, one or more phenolic resins (including novolac and/or resole phenolic resins), one or more epoxy resins, one or more urea-formaldehyde binders, one or more polyester resins, one or more polyimide resins, one or more rubbers, one or more polybenzimidazole resins, one or more shellacs, one or more acrylic monomers and/or oligomers, and combinations thereof. The organic binder precursor(s) may be combined with additional components such as, for example, curatives, hardeners, catalysts, initiators, colorants, antistatic agents, grinding aids, and lubricants.

Useful phenolic resins include novolac and resole phenolic resins. Novolac phenolic resins are characterized by being acid-catalyzed and as having a ratio of formaldehyde to phenol of less than one, for example, between 0.5:1 and 0.8:1. Resole phenolic resins are characterized by being alkaline catalyzed and having a ratio of formaldehyde to phenol of greater than or equal to one, for example from 1:1 to 3:1. Novolac and resole phenolic resins may be chemically modified (e.g., by reaction with epoxy compounds), or they may be unmodified. Exemplary acidic catalysts suitable for curing phenolic resins include sulfuric, hydrochloric, phosphoric, oxalic, and p-toluenesulfonic acids. Alkaline catalysts suitable for curing phenolic resins include sodium hydroxide, barium hydroxide, potassium hydroxide, calcium hydroxide, organic amines, or sodium carbonate.

Phenolic resins are well-known and readily available from commercial sources. Examples of commercially available novolac resins include DUREZ 1364, a two-step, powdered phenolic resin (marketed by Durez Corporation, Addison, Tex., under the trade designation VARCUM (e.g., 29302), or DURITE RESIN AD-5534 (marketed by Hexion, Inc., Louisville, KY). Examples of commercially available resole phenolic resins useful in practice of the present disclosure include those marketed by Durez Corporation under the trade designation VARCUM (e.g., 29217, 29306, 29318, 29338, 29353): those marketed by Ashland Chemical Co., Bartow, Fla. under the trade designation AEROFENE (e.g., AEROFENE 295); and those marketed by Kangnam Chemical Company Ltd., Seoul, South Korea under the trade designation "PHENOLITE" (e.g., PHENOLITE TD-2207).

With regards to vitrified binding materials, vitreous bonding materials, which exhibit an amorphous structure and are hard, are well known in the art. In some cases, the vitreous bonding material includes crystalline phases. Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Vitreous bonding materials can be formed from a composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in the range from about 700° C. to about 1500° C., usually in the range from about 800° C. to about 1300° C. sometimes in the range from about 900° C. to about 1200° C., or even in the range from about 950° C. to about 1100° C. The actual temperature at which the bond is matured depends, for example, on the particular bond chemistry. Preferred vitrified bonding materials may include those comprising silica, alumina (preferably, at least 10 percent by weight alumina), and boria (preferably, at least 10 percent by weight boria). In most cases the vitrified bonding materials further comprise alkali metal oxide(s) (e.g., Na2O and K2O) (in some cases at least 10 percent by weight alkali metal oxide(s)).

Apparatus for Dispensing Abrasive Particles

Figure 9:
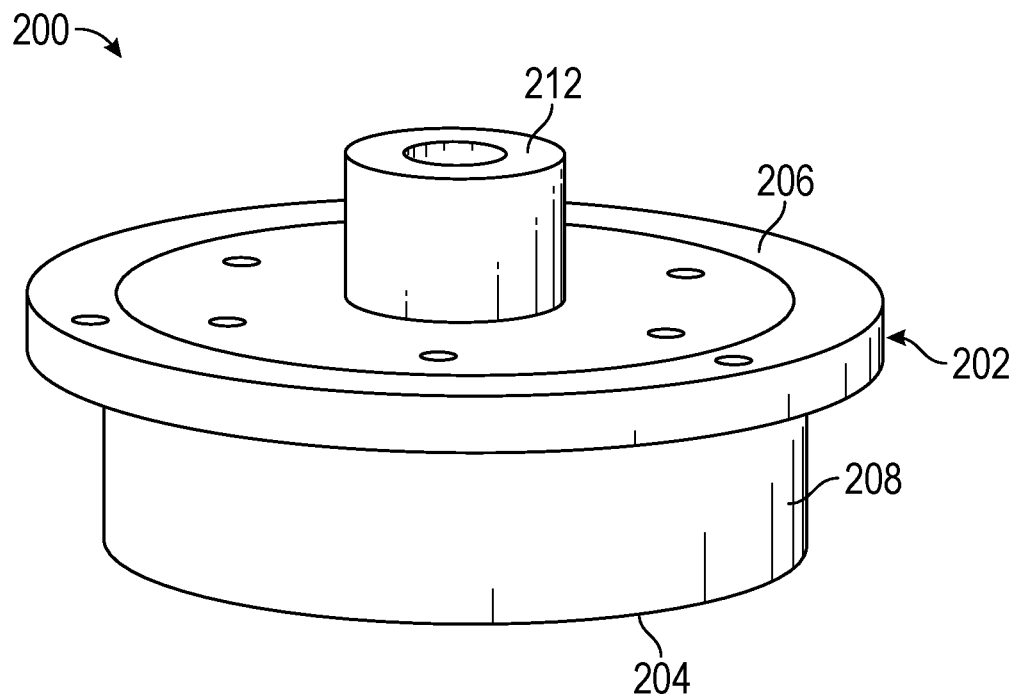
FIG. 9 is a perspective view of an apparatus for forming a layer of the abrasive particles.
Figure 10:
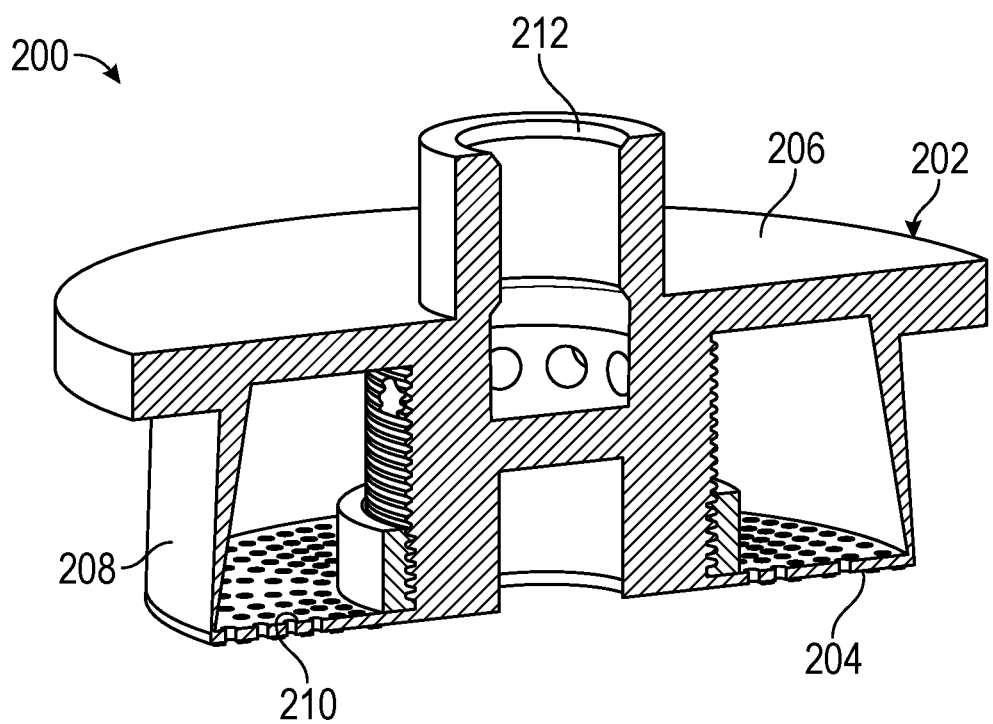
FIG. 10 is a perspective sectional view of the apparatus for forming a layer of abrasive particles.
Figure 11:
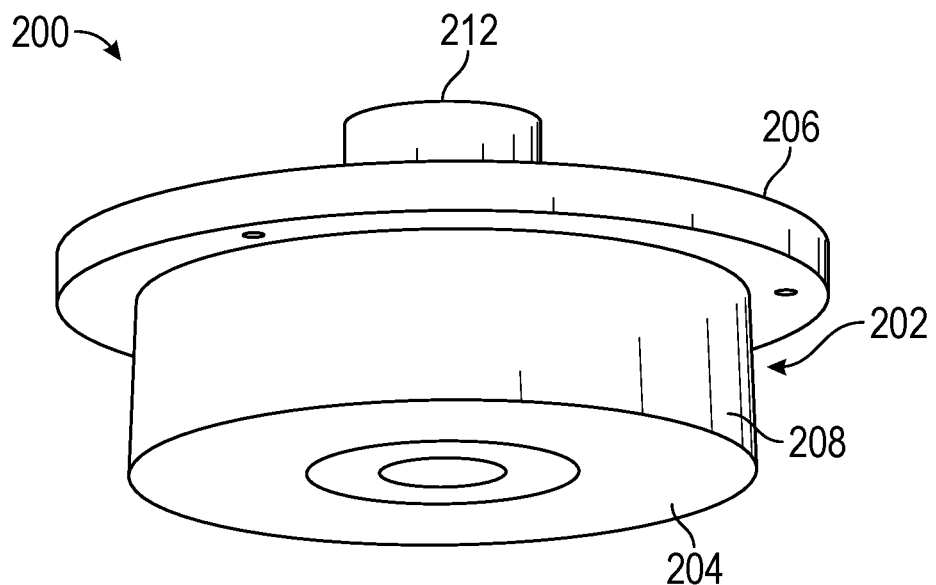
FIG. 11 is another perspective view of the apparatus for forming a layer of the abrasive particles.
Figure 12:
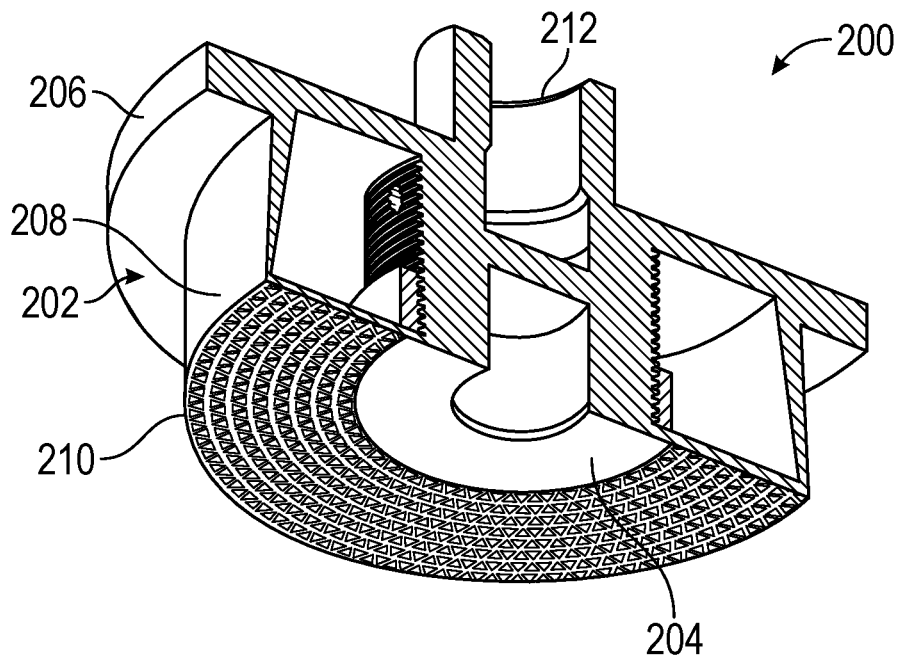
FIG. 12 is another perspective sectional view of the apparatus for forming a layer of abrasive particles.

FIGS. 9 and 11 are perspective views of apparatus 200. FIGS. 10 and 12 are perspective sectional views of the apparatus. The apparatus can be used to form a layer of abrasive particles such as the first layer and the second layer of abrasive particles. FIGS. 9-12 will be discussed concurrently. As shown in FIGS. 9-12, the apparatus includes housing 202. The housing is formed from housing first major surface 204 and opposed housing second major surface 206. The housing first major surface and the housing second major surface are connected by housing peripheral surface 208.

The apparatus first major surface has a substantially planar profile and includes a plurality of holes 210 extending therethrough. Each hole is adapted to receive an abrasive particle. At least some of the holes are further arranged on the apparatus first major surface in a pattern. The pattern can correspond to, for example, the predetermined pattern of the abrasive particles of the first, second, or third abrasive particle layers. In some examples, the holes can be randomly arranged. In still other examples, at least some of the holes can be arranged in a pattern, whereas other holes are randomly arranged.

The type of abrasive particle that the hole receives is a function of the size (e.g., width) and shape of each hole. Each hole can receive particles that have a width smaller than the width of the hole. This provides a first screening feature to help ensure that only desired abrasive particles are received by the holes. A second screening feature is the shape of the hole.

The holes can have any suitable polygonal shape. For example, the polygonal shape can be substantially triangular, circular, rectangular, pentagonal, substantially hexagonal, and so forth. These shapes can be adapted to receive specific shaped abrasive particles. For example, if a hole is triangularly shaped, it may be best suited to receive a triangularly shaped abrasive particle. Due to the triangular shape, a square shaped abrasive particle will not fit in the hole (provided that the particle has a larger width than the hole). Thus, the shape of the hole in combination with the width can control the type of abrasive particle that is received.

In some examples, each of the holes can be in the shape of an equilateral triangular hole. A length of each side can range from about 0.5 mm to about 3 mm, or about 1 mm to about 1.5 mm, or less than about, equal to about, or greater than about 1 mm, 1.5 mm, 2 mm, or about 2.5 mm. An angle of a sidewall of each hole may range from about 80 degrees to about 105 degrees relative to the bottom of each hole, or about 95 degrees to about 100 degrees, or less than about, equal to about, or greater than about 85 degrees, 90, 95, or 100 degrees. The depth of each hole may range from about 0.10 mm to about 0.50 mm, or about 0.20 mm to about 0.30 mm or less than about, equal to about, or greater than about 0.15 mm, 0.20, 0.25, 0.30, 0.35, 0.40, or 0.45 mm.

In addition to having regular shaped holes, the apparatus can have an irregular shape. That is, the shape of the holes can be designed to substantially match the shape of crushed abrasive particles. While great variety in the dimensions of the holes is possible, each hole can also be designed to have substantially the same size. This configuration may be desirable for applications in which each abrasive particle of an abrasive layer has the same size.

The holes can be further shaped to have a smaller width on one end of the hole than on the other end. That is, the width of the hole at the apparatus first major surface can be wider than that of the internal end of the hole. For example, the width of the hole at the first end can range from about 1.1 to about 4 times larger than the width of the hole at the second end, or about 2 to about 3 times larger, or less than about, equal to, or greater than about 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, or 4.9 times larger than the width of the hole at the second end. This way the abrasive particle will not pass completely through the hole and into the housing. The interior of the holes can also be sloped. This can allow for a specific orientation of shaped abrasive particles within the hole. For example, some abrasive particles may have sloped sidewalls. The interior of the holes may in turn be sloped to match the sidewalls of the abrasive particles.

In some examples of the apparatus, the apparatus first major surface can be releasably secured to housing. This can allow the apparatus to have interchangeable apparatus first surfaces. Each apparatus first surface can have differently sized holes or patterns of holes. Thus, the apparatus can be very versatile in terms of the types of abrasive particles that it may receive as well as the patterns it can create.

The apparatus can releasably secure the abrasive particles in any number of sufficient ways. For example, as shown, the housing includes inlet 212 located on the apparatus second major surface. The inlet can be adapted to be connected to a vacuum generation system. In operation, a low pressure (e.g., vacuum-like) environment can be created within the housing. Thus, any abrasive particles disposed within the holes are retained therein by suction. To release the abrasive particles the vacuum generation system is turned off, thus resulting in a loss of suction. Alternatively, a magnet can be disposed within the housing that can be selectively engaged or disengaged. If the abrasive particles have metal in or on them, respectively, then they may be attracted to the magnet and drawn to the holes.

The operation of the apparatus will be further described in conjunction with a method of forming the abrasive article.

Methods of Forming Abrasive Articles

Abrasive articles 100, according to the present disclosure, can be made according to any suitable method. One method includes retaining a first plurality of abrasive particles within a first portion of the plurality of holes of the apparatus described herein. The apparatus can be positioned within a mold and the first plurality of abrasive particles are released in the mold. Binder material is then deposited to form a mixture of abrasive particles and binder material. The mold can then be heated to form the abrasive article.

The first portion of the plurality of holes can range from about 5% to about 100% of the total amount of holes of the apparatus, or from about 30% to about 60%, or less than about, equal to about, or greater than about 10%, 15, 20, 25, 30, 35, 40, 45, 50, 55, 60, 65, 70, 75, 80, 85, 90, or 95%. In examples where the first portion of the plurality of holes is less than 100%, a second plurality of abrasive particles can be retained within a second portion of the plurality of holes of the apparatus. The second portion of the plurality of holes can range from about 5% to about 99% of the total amount of holes of the apparatus, or from about 30% to about 60%, or less than about, equal to about, or greater than about 10%, 15, 20, 25, 30, 35, 40, 45, 50, 55, 60, 65, 70, 75, 80, 85, 90, or 95%.

Figure 13:
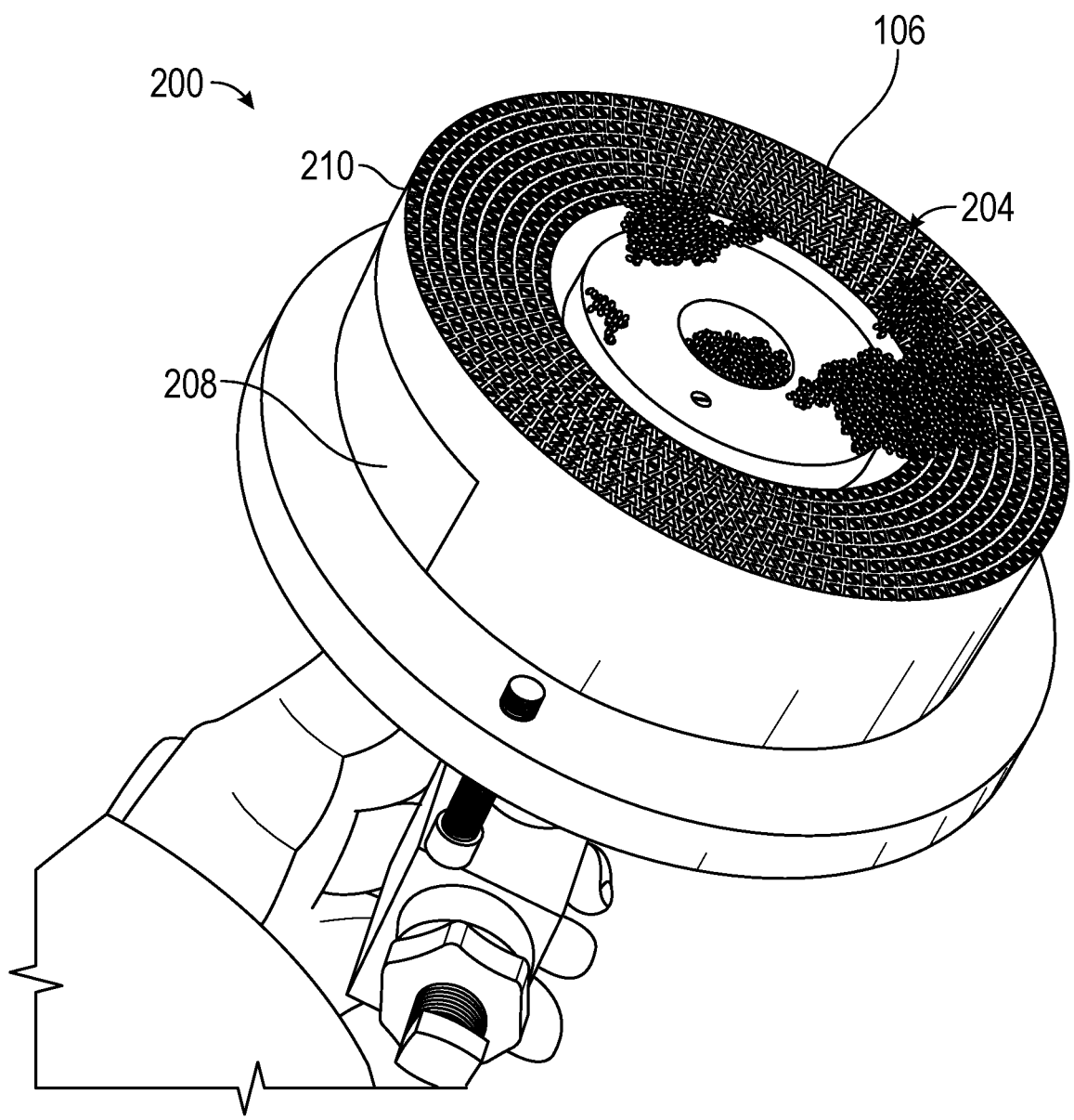
FIG. 13 is a perspective view showing the apparatus in which abrasive particles are contacting the apparatus first major surface.

FIG. 13 is a perspective view showing the apparatus in which a first plurality of the abrasive particles is contacting the apparatus first major surface. The abrasive particles can be contacted with the apparatus first major surface by pouring the particles over the apparatus or by immersing the apparatus in the abrasive particles.

Figure 14:
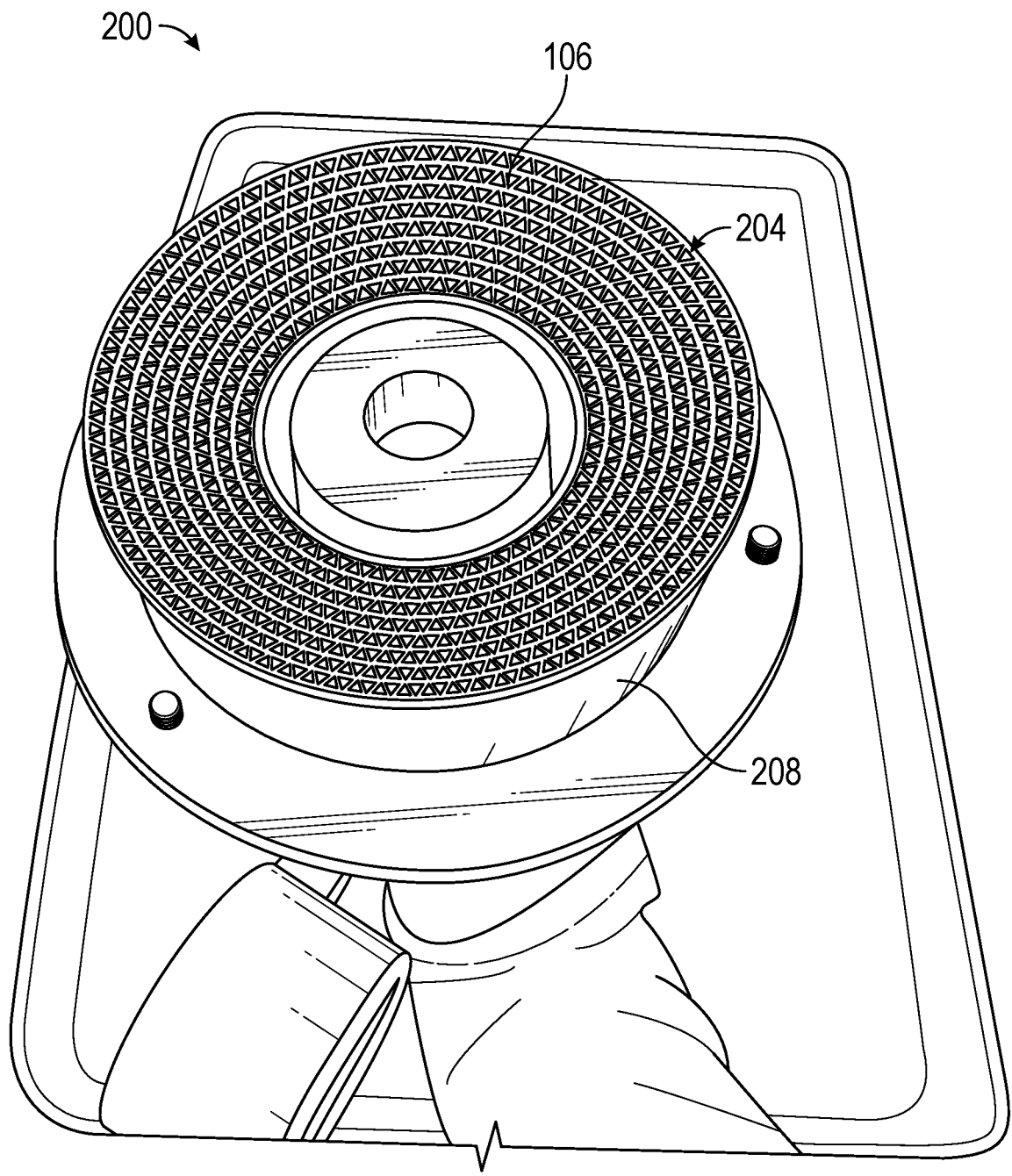
FIG. 14 is a perspective view showing the abrasive particles retained in the holes of the apparatus.

The vacuum generation system is engaged after a majority (e.g., around 95%) of the holes of the apparatus are filled with abrasive particles the vacuum generation system is engaged. This results in the pressure inside the housing being decreased. FIG. 14 is a perspective view showing the abrasive particles retained in the holes of the apparatus once the vacuum is engaged. Alternatively the particles could be retained through activation of a magnet within the housing.

Figure 15:
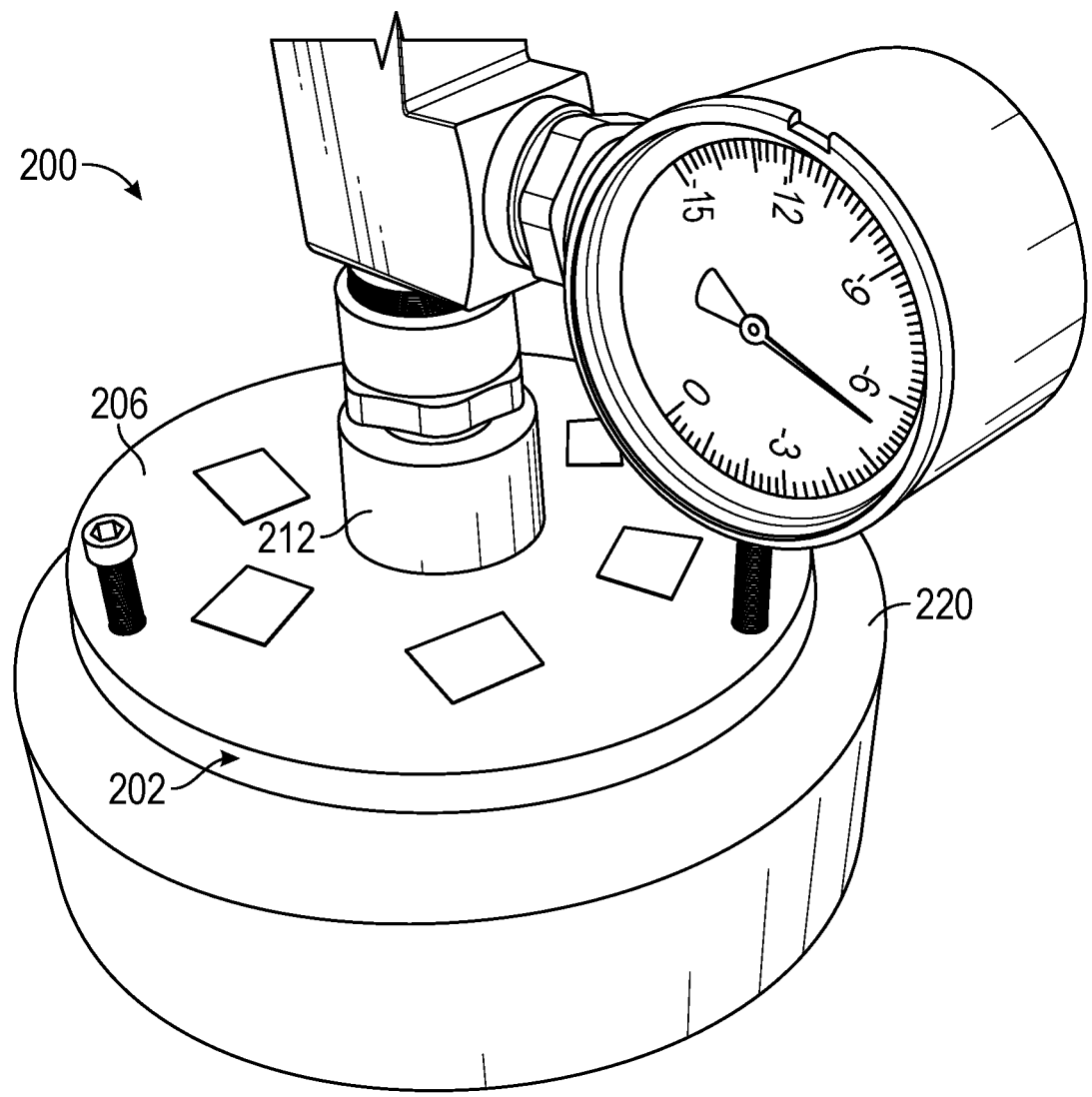
FIG. 15 is a perspective view showing the apparatus positioned within a mold.
Figure 16:
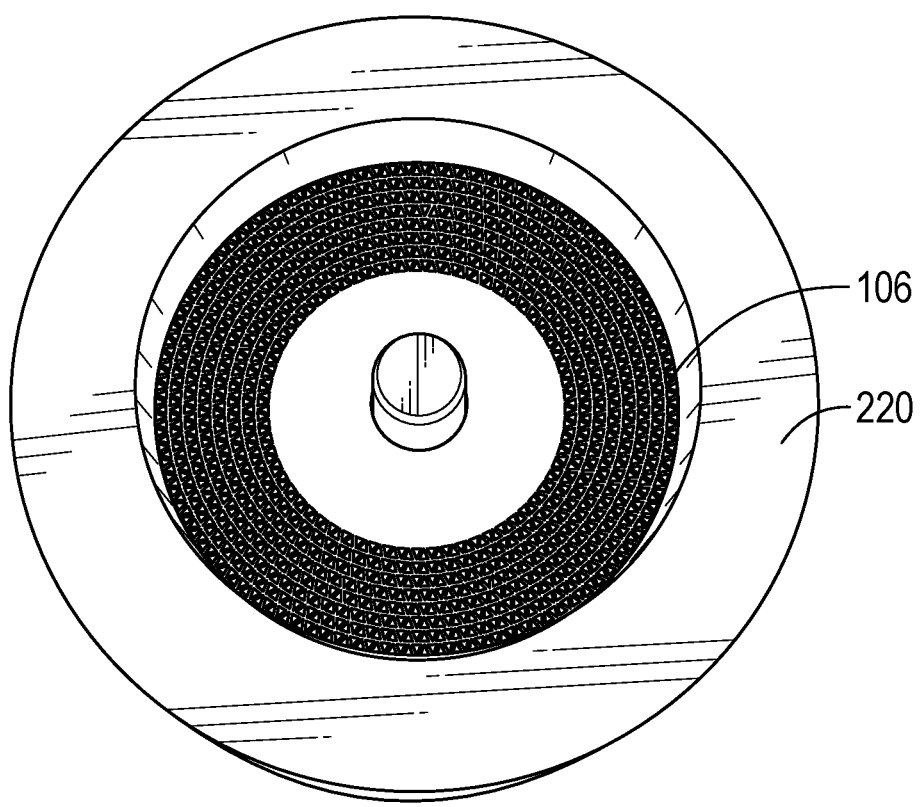
FIG. 16 is a perspective view showing the abrasive particles deposited within the mold.

FIG. 15 is a perspective view showing the apparatus positioned within mold 220. Once the apparatus is adequately positioned within the mold the abrasive particles are released. The release of the abrasive particles can be accomplished by increasing the pressure within the housing or disengaging the magnet. A majority of the abrasive particles are released into the mold upon the increase in pressure or disengagement of the magnet. The particles can be released substantially simultaneously or over a time period ranging up to about 10 seconds. FIG. 16 is a perspective view showing the abrasive particles in the mold after release. Upon release, the abrasive particles contact any binder material predisposed in the mold. If there is no binder material in the mold, then binder material can be added after the abrasive particles are deposited in the mold. The abrasive particles and the binder form a mixture. The mixture can optionally be pressed.

Because at least a majority of the holes in the apparatus are arranged in a predetermined pattern at least a majority of the abrasive particles are deposited in the mold in a predetermined pattern. Thus, to form a predetermined pattern of the abrasive particles, it is not necessary to attach the particles to a reinforcing layer such as a scrim or to arrange the particles in a scaffold structure that is incorporated into the abrasive article. Additional layers of abrasive particles can be formed by reloading the apparatus and depositing additional layers of abrasive particles in the mold on top of a previously deposited layer of abrasive particles.

After the desired amount of layers of abrasive particles are deposited in the mold, the mixture is cured by heating at, for example, temperatures ranging from about 70° C. to about 200° C. The mixture is heated for a sufficient time to cure the curable phenolic resins. For example, suitable times can range from about 2 hours to about 40 hours. Curing can also be done in a stepwise fashion; for example, the wheel can be heated to a first temperature ranging from about 70° C. to about 95° C. for a time ranging from about 2 hours to about 40 hours. The mixture can then be heated at a second temperature ranging from about 100° C. to about 125° C. for a time ranging from about 2 hours to about 40 hours. The mixture can then be heated at a third temperature ranging from about 140° C. to about 200° C. for a time ranging from about 2 hours to about 10 hours. The mixture can be cured in the presence of air. Alternatively, to help preserve any color, the wheel can be cured at a higher temperature (e.g., greater than 140° C.) under nitrogen where the concentration of oxygen is relatively low.

Abrasive articles may be formed to have one of many shapes; for example, the wheel may have a shallow or flat dish or saucer with curved or straight flaring sides, and may have either a straight or depressed center portion encircling and adjacent to the central aperture (e.g., as in a Type 27 depressed center grinding wheel). As used herein, the term "straight center" is meant to include abrasive wheels other than depressed-center or raised-hub abrasive wheels, and those having front and back surfaces that continue without any deviation or sharp bends to the central aperture.

Abrasive articles, according to the present disclosure are useful, for example, as grinding wheels, including abrasives industry Type 27 (e.g., as in American National Standards Institute standard ANSI B7.1-2000 (2000) in section 1.4.14) depressed-center grinding wheels.

In use, a peripheral grinding edge of the front surface of a rotating abrasive wheel, according to the present disclosure is secured to a rotating powered tool and brought into frictional contact with a surface of a workpiece and at least a portion of the surface is abraded. If used in such a manner, the abrasive performance of the abrasive article advantageously closely resembles the abrasive performance of a single layer construction wherein the shaped abrasive particles, and any optional diluent crushed abrasive particles, are distributed throughout the abrasive wheel.

Abrasive articles, according to the present disclosure, can be used dry or wet. During wet grinding, the article is used in conjunction with water, oil-based lubricants, or water-based lubricants. Abrasive articles according to the present disclosure may be particularly useful on various workpiece materials such as, for example, carbon steel sheet or bar stock and more exotic metals (e.g., high alloy steel or titanium), or on softer more ferrous metals (e.g., mild steel, low alloy steels, or cast iron).

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

Unless stated otherwise, all other reagents were obtained, or are available from fine chemical vendors such as Sigma-Aldrich Company, St. Louis, Missouri, or may be synthesized by known methods.

Unit Abbreviations Used in the Examples

° C.: degrees Centigrade
cm: centimeter
g: gram
mm: millimeter
Materials used in the Examples are described in Table 1:

TABLE 1

| ABBREVI-ATION | DESCRIPTION |
| --- | --- |
| CG | SCTSK alumina particles, ANSI 54, obtained from Imerys Fused Minerals Villach GmbH, Villach, Austria |
| PRL | liquid phenolic resin obtained as PREFERE 92 5136G1 from Dynea Erkner GmbH, Erkner, Germany |
| NPR | novolac phenolic resin obtained as HEXION 0224P from Momentive Specialty Chemicals Columbus, Ohio |
| AO | ZWSK F400 alumina particles obtained from Imerys Fused Minerals Villach GmbH, Villach, Austria |
| PAF | potassium fluoroaluminate, particle size distribution $d_{10}$ = 2.58 micrometers, $d_{50}$ = 11.5 micrometers, $d_{90}$ = 36.6 micrometers, from KBM Afflips B.V., Oss, The Netherlands. |
| PMIX | premix powder blend prepared according to the procedure described in "Preparation of Mixes" below |
| SAP | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles, which were shaped as truncated triangular pyramids, were about 1.4 mm (side length) × 0.35 mm (thickness), with a draft angle approximately 98 degrees |
| SCRIM1 | fiberglass mesh scrim attached to a cloth mesh, obtained as RXV08-125 × 23 MM from Rymatex Sp, zo.o, Rymanów, Poland |

TABLE 1-continued

| ABBREVI-ATION | DESCRIPTION |
| --- | --- |
| SCRIM2 | fiberglass mesh scrim, obtained as RX08-125 × 23 MM from Rymatex Sp. zo.o, Rymanów, Poland |
| MF | metal flange 28 mm × 22.45 mm × 1.2 mm, obtained from Lumet PPUH in Jasło, Poland |
| MIX1 | abrasive mix prepared according to the procedure described in "Preparation of Mixes" below |

Preparation of Mixes

A premix powder blend was created according to Table 2. All components were mixed in a v-blender for 1 hour. The resulting mix was referred to as PMIX.

TABLE 2

| PMIX | |
| --- | --- |
| Component | Amount (grams) |
| NPR | 396 |
| AO | 82 |
| PAF | 522 |

The abrasive mix was prepared according to the composition listed in Table 3. The mix was prepared by first mixing CG with PRL for 7 minutes in a paddle mixer, then the PMIX powder blend was added and mixed for 7 additional minutes. This resulting mix was referred to as MIX1.

TABLE 3

| MIX1 | |
| --- | --- |
| Component | Amount (grams) |
| CG | 600 |
| PMIX | 320 |
| PRL | 50 |

Example 1

A Type 1 composite grinding wheel was prepared in the following manner. A 5-inch (12.7 cm) diameter disc of SCRIM1 was placed into the mold. MIX1 (14 grams) was spread out evenly on top of SCRIM1. A placement tool apparatus, having a particle plate defining an apparatus first major surface with precisely spaced and oriented equilateral triangular pockets or holes arranged in a radial array with length of 1.90 mm/side with sidewall angles of 98 degrees relative to the bottom of each hole, a of 0.35 mm, with each hole having a through hole of 0.60 mm was then filled with SAP assisted by tapping. The apparatus is shown in FIGS. 9-12.

A vacuum source was applied to the internal holes of the placement tool and the placement tool was inverted. SAP particles in excess of those accommodated into the tool's cavities fell off the surface of the tool so that a single particle was maintained in the majority of the cavities. The inverted tool was lowered down into the interior of the mold cavity so that the adjustment screws on the outer perimeter rested on the surface of the ring of the mold, bringing the gap between the face of the particle plate and the surface of the layer of MIX1 inside the mold to 1.5 mm (FIG. 15). The vacuum source was then removed and the SAP particles were deposited on the surface of MIX1 in the predetermined pattern of the tool (FIG. 16). The total weight of SAP applied in this layer was 2.1 g. The tool was then removed and the mold was placed into a hydraulic press and pressed at 5 tons. The mold was then removed from the press and 12 additional grams of MIX1 was spread out evenly inside the mold on top of the previously added layers. The placement tool was then filled with SAP and the particles were then deposited into the mold in the same manner as previously described, bringing the total weight of SAP in the article to 4.2 g. Then, a 5-inch (12.7 cm) diameter disc of SCRIM2 was placed into the mold followed by a metal flange MF. The mold was then placed into a hydraulic press and pressed at 30 tons. The cutoff wheel precursor was then removed from the mold and cured in a stack with the following cure cycle: 2 hours at 75° C., 2 hours at 90° C., 5 hours at 110° C., 3 hours at 135° C., 3 hours at 188° C., 13 hours at 188° C., and then 2 hours temperature ramp down to 60° C. The final thickness of the wheel was in the range of 1.21 mm to 1.44 mm.

Comparative Example A

A Type 1 composite grinding wheel was prepared in the following manner. A 5-inch (12.7 cm) diameter disc of SCRIM1 was placed into the mold. MIX1 (14 grams) was spread out evenly on top of SCRIM1. 2.1 g of SAP was sprinkled into the mold on top of MIX1 evenly but with a random (non-patterned and non-oriented) placement. The mold was placed into a hydraulic press and pressed at 5 tons. The mold was then removed from the press and 12 additional grams of MIX1 was spread out evenly inside the mold on top of the previously added layers. An additional 2.1 g of SAP was sprinkled into the mold on top of the second layer of MIX1 evenly but with a random (non-patterned and non-oriented) placement, bringing the total weight of SAP in the article to 4.2 g. Then, a 5-inch (12.7 cm) diameter disc of SCRIM2 was placed into the mold followed by a metal flange MF. The mold was then placed into a hydraulic press and pressed at 30 tons. The cutoff wheel precursor was then removed from the mold and cured in a stack with the following cure cycle: 2 hours at 75° C., 2 hours at 90° C., 5 hours at 110° C. 3 hours at 135° C., 3 hours at 188° C., 13 hours at 188° C., and then 2 hours temperature ramp down to 60° C. The final thickness of the wheel was in the range of 1.20 mm to 1.42 mm.
Performance Test A 40-inch (1 meter) long by 20-inch (0.51 meter) wide sheet of ⅛ inch (3.2 mm) thick stainless steel was secured with its major surface inclined at a 35-degree angle relative to horizontal. A guide rail was secured along the downward-sloping top surface of the inclined sheet. A 4.5-inch (1 1.4-cm)/5-inch (12.7-cm) cutoff wheel angle grinder, obtained as MODEL D28114 from DeWalt, Baltimore, Maryland, was secured to the guide rail such that the tool was guided in a downward path under the force of gravity. A cutoff wheel for evaluation was mounted on the tool such that the cutoff wheel encountered the full thickness of the stainless steel sheet when the cutoff wheel tool was released to traverse downward, along the rail under gravitational force. The cutoff wheel tool was activated to rotate the cutoff wheel at 10000 revolutions per minute, the tool was released to begin its descent, and the length of the resulting cut in the stainless steel sheet was measured after 60 seconds. Dimensions of the cutoff wheel were measured before and after the cutting test to determine wear. Performance results are shown in Table 4.

ADDITIONAL EMBODIMENTS

TABLE 4

|  | Length of cut (mm) | Total wheel wear (mm³) | Ratio of length of cut to wheel wear |
| --- | --- | --- | --- |
| COMPARATIVE EXAMPLE A | 838.2 | 3883.3 | 0.216 |
| EXAMPLE 1 | 965.2 | 2272.8 | 0.425 |

The following exemplary embodiments are provided, the numbering of which is not to be construed as designating levels of importance:

Embodiment 1 provides an abrasive article comprising:
a first major surface and an opposed second major surface each contacting a peripheral side surface;
a central axis extending through the first and second major surfaces:
a first layer of abrasive particles dispersed within the abrasive article according to a first predetermined pattern:
a second layer of abrasive particles spaced apart from the first layer of abrasive particles and dispersed within the abrasive article according to a second predetermined pattern; and
a binder material retaining the first and second layers of abrasive particles, wherein at least a portion of the binder material located between the first and second layers of abrasive particles is substantially continuous therebetween:
wherein the first layer of abrasive particles comprises at least one of a first plurality of abrasive particles and a second plurality of abrasive particles that is different than the first plurality of particles.

Embodiment 2 provides the abrasive article of Embodiment 1, wherein the first major surface and the second major surface have a substantially circular profile.

Embodiment 3 provides the abrasive article of any one of Embodiments 1 or 2, further comprising a central aperture extending at least partially between the first and second major surfaces.

Embodiment 4 provides the abrasive article of Embodiment 3, wherein the central axis extends through the central aperture.

Embodiment 5 provides the abrasive article of any one of Embodiments 1-4, optionally further comprising a third layer of abrasive particles adjacent to at least one of the first or second layers of abrasive particles and dispersed within the abrasive article according to a third predetermined pattern.

Embodiment 6 provides the abrasive article of Embodiment 5, wherein the article is free of a reinforcing layer between adjacent layers of abrasive particles.

Embodiment 7 provides the abrasive article of any one of Embodiments 5 or 6, wherein the predetermined pattern of the first, second, and third layers of abrasive particles is substantially the same.

Embodiment 8 provides the abrasive article of any one of Embodiments 5-7, wherein a portion of a majority of the abrasive particles of the first layer or third layer comprises a portion of the first major surface.

Embodiment 9 provides the abrasive article of any one of Embodiments 5-8, wherein a portion of each abrasive particle of the second layer or third layer defines a portion of the second major surface.

Embodiment 10 provides the abrasive article of any one of Embodiments 5-9, wherein the abrasive particles of at least one of the first layer, the second layer, and the third layer are encapsulated by the binder material.

Embodiment 11 provides the abrasive article of any one of Embodiments 5-10, wherein at least one of the first layer of abrasive particles, the second layer of abrasive particles, and the third layer of abrasive particles ranges from about 2 wt % to about 50 wt % of the abrasive article.

Embodiment 12 provides the abrasive article of any one of Embodiments 5-11, wherein at least one of the first layer of abrasive particles, the second layer of abrasive particles, and the third layer of abrasive particles ranges from about 25 wt % to about 30 wt % of the abrasive article.

Embodiment 13 provides the abrasive article of Embodiment 12, wherein at least one of the first plurality of abrasive particles and the second plurality of abrasive particles comprise at least one of shaped abrasive particles and crushed abrasive particles.

Embodiment 14 provides the abrasive article of any one of Embodiments 12 or 13, wherein at least one of the first plurality of abrasive particles and the second plurality of abrasive particles ranges from about 10 wt % to about 100 wt % of the first layer of abrasive particles.

Embodiment 15 provides the abrasive article of any one of Embodiments 12-14, wherein at least one of the first plurality of abrasive particles and the second plurality of abrasive particles ranges from about 60 wt % to about 100 wt % of the first layer of abrasive particles.

Embodiment 16 provides the abrasive article of any one of Embodiments 12-15, wherein the abrasive particles of the first plurality of abrasive particles are different than the abrasive particles of the second plurality of particles.

Embodiment 17 provides the abrasive article of any one of Embodiments 12-16, wherein a size of the abrasive particles of the first plurality of abrasive particles is different than a size of the abrasive particles of the second plurality of abrasive particles.

Embodiment 18 provides the abrasive article of any one of Embodiments 12-17, wherein a size of the abrasive particles of the first plurality of abrasive particles is substantially the same as a size of the abrasive particles of the second plurality of abrasive particles.

Embodiment 19 provides the abrasive article of any one of Embodiments 1-18, wherein the second layer of abrasive particles comprises at least one of a third plurality of abrasive particles and a fourth plurality of abrasive particles.

Embodiment 20 provides the abrasive article of Embodiment 19, wherein at least one of the third plurality of abrasive particles and the fourth plurality of abrasive particles comprise at least one of shaped abrasive particles and crushed abrasive particles.

Embodiment 21 provides the abrasive article of any one of Embodiments 19 or 20, wherein at least one of the third plurality of abrasive particles and the fourth plurality of abrasive particles ranges from about 10 wt % to about 100 wt % of the first layer of abrasive particles.

Embodiment 22 provides the abrasive article of any one of Embodiments 19-21 wherein at least one of the third plurality of abrasive particles and the fourth plurality of abrasive particles ranges from about 60 wt % to about 100 wt % of the first layer of abrasive particles.

Embodiment 23 provides the abrasive article of any one of Embodiments 19-22, wherein the abrasive particles of the third plurality of abrasive particles are different than the abrasive particles of the fourth plurality of particles.

Embodiment 24 provides the abrasive article of any one of Embodiments 19-23, wherein a size of the abrasive particles of the third plurality of abrasive particles is different than a size of the abrasive particles of the fourth plurality of abrasive particles.

Embodiment 25 provides the abrasive article of any one of Embodiments 19-24, wherein a size of the abrasive particles of the third plurality of abrasive particles is substantially the same as a size of the abrasive particles of the fourth plurality of abrasive particles.

Embodiment 26 provides the abrasive article of any one of Embodiments 1-25, wherein the portion of the binder is substantially monolithic.

Embodiment 27 provides the abrasive article of any one of Embodiments 1-26, wherein the portion of the binder is 100 wt % of the binder.

Embodiment 28 provides the abrasive article of any one of Embodiments 1-27, wherein the binder is substantially free of striations between the first, second, and third layers of abrasive particles.

Embodiment 29 provides the abrasive article of any one of Embodiments 1-28, wherein the binder material comprises an organic binder.

Embodiment 30 provides the abrasive article of Embodiment 29, wherein the organic binder comprises a phenolic resin.

Embodiment 31 provides the abrasive article of any one of Embodiments 1-30, wherein the binder comprises a vitrified binding material.

Embodiment 32 provides the abrasive article of any one of Embodiments 1-31, wherein the binder comprises a metallic binding material.

Embodiment 33 provides the abrasive article of any one of Embodiments 1-32, wherein the binder comprises at least one of a shaped abrasive particle, a crushed abrasive particle, and a filler particle.

Embodiment 34 provides the abrasive article of any one of Embodiments 1-33, wherein the abrasive article is at least one of a cut-off wheel, a cut-and-grind wheel, a depressed center grinding wheel, a depressed center cut-off wheel, a reel grinding wheel, a mounted point, a tool grinding wheel, a roll grinding wheel, a hot-pressed grinding wheel, a face grinding wheel, a rail grinding wheel, a grinding cone, a grinding plug, a cup grinding wheel, a gear grinding wheel, a centerless grinding wheel, a cylindrical grinding wheel, an inner diameter grinding wheel, an outer diameter grinding wheel and a double disk grinding wheel.

Embodiment 35 provides a method of using the abrasive article of any one of Embodiments 1-34, comprising:
contacting a surface and the abrasive article; and
moving the abrasive article with respect to the surface, to abrade the surface.

Embodiment 36 provides an apparatus for forming a layer of abrasive particles, the apparatus comprising:
a housing comprising a first apparatus major surface, an opposed second apparatus, and a peripheral surface connecting the first apparatus major surface and the second apparatus major surface;
wherein the first apparatus major surface comprises a plurality of holes each adapted to receive an abrasive particle.

Embodiment 37 provides the apparatus of Embodiment 36, wherein the first apparatus major surface has a substantially planar profile.

Embodiment 38 provides the apparatus of any one of Embodiments 36-37, wherein the housing comprises an inlet adapted to connect to a vacuum generator.

Embodiment 39 provides the apparatus of Embodiment 36, further comprising a magnet aligned with at least one of the holes of the first surface.

Embodiment 40 provides the apparatus of Embodiment 39, wherein the magnet is located within the housing.

Embodiment 41 provides the apparatus of Embodiment 36, wherein a majority of the holes is substantially the same size.

Embodiment 42 provides the apparatus of Embodiment 36, wherein the plurality of holes comprises a first hole and a second hole, wherein a size of at least the first hole and the second hole are different.

Embodiment 43 provides the apparatus of Embodiment 36, wherein at least one of the holes has a polygonal shape.

Embodiment 44 provides the apparatus of Embodiment 43, wherein the polygonal shape is substantially a shape chosen from triangular, circular, rectangular, pentagonal, and substantially hexagonal.

Embodiment 45 provides the apparatus of Embodiment 36, wherein at least one of the holes has an irregular shape.

Embodiment 46 provides the apparatus of Embodiment 36, wherein the first apparatus major surface is releasably secured to the housing.

Embodiment 47 provides a method of forming an abrasive article comprising:
retaining a first plurality of abrasive particles within a first portion of the plurality of holes of the apparatus of Embodiment 36;
positioning the apparatus at least partially within a mold;
releasing the first plurality of abrasive particles into the mold:
depositing a binder material in the mold; and
pressing the binder material.

Embodiment 48 provides the method of Embodiment 47, further comprising contacting the first apparatus major surface of the apparatus with the plurality of abrasive particles.

Embodiment 49 provides the method of any one of Embodiments 47 or 48, wherein retaining the first plurality of abrasive particles in the portion of the plurality of holes comprises at least one of:
decreasing a pressure within the housing; and
activating a magnet within in the housing.

Embodiment 50 provides the method of Embodiment 49, wherein releasing the first plurality of abrasive particles in the portion of the plurality of holes comprises at least one of:
increasing the pressure within the housing; and
deactivating a magnet within in the housing.

Embodiment 51 provides the method of any one of Embodiments 47-50, wherein the first portion of the plurality of holes ranges from about 5% of the total amount of holes of the first apparatus major surface to about 100% of the total amount of holes of the first apparatus major surface.

Embodiment 52 provides the method of any one of Embodiments 47-51, wherein the first portion of the plurality of holes ranges from about 30% of the total amount of holes of the first apparatus major surface to about 60% of the total amount of holes of the first apparatus major surface.

Embodiment 53 provides the method of any one of Embodiments 47-52, further comprising retaining a second plurality of abrasive particles within a second portion of the plurality of holes of the apparatus.

Embodiment 54 provides the method of Embodiment 53, wherein the second portion of the plurality of holes ranges from about 5% of the total amount of holes of the first apparatus major surface to about 100% of the total amount of holes of the first apparatus major surface.

Embodiment 55 provides the method of Embodiment 53, wherein the second portion of the plurality of holes ranges from about 30% of the total amount of holes of the first apparatus major surface to about 60% of the total amount of holes of the first apparatus major surface.

Embodiment 56 provides the method of any one of Embodiments 53-55, wherein at least one of a shape and a size of the first plurality of abrasive particles and the second plurality of abrasive particles is different.

Embodiment 57 provides the method of any one of Embodiments 47-56, further comprising substantially simultaneously releasing the abrasive particles of the first plurality of abrasive particles.

Embodiment 58 provides the method of any one of Embodiments 47-57, further comprising contacting the binder material of the first plurality of abrasive particles.

Embodiment 59 provides the method of any one of Embodiments 47-58, further comprising heating the mold.

Embodiment 60 provides the method of any one of Embodiments 58 or 59, further comprising:
retaining a third plurality of abrasive particles within a third portion of the plurality of holes of the apparatus;
positioning the apparatus within a mold; and
releasing the first plurality of abrasive particles into the mold and in contact with the deposited binder material.

What is claimed is:

1. An abrasive article comprising:
a first major surface and an opposed second major surface each contacting a peripheral side surface;
a central axis extending through the first and second major surfaces;
a first layer of abrasive particles dispersed within the abrasive article according to a first predetermined pattern, wherein the first predetermined pattern comprises precise spacing between adjacent particles, and precise orientation of abrasive particles in the first layer of abrasive particles;
a second layer of abrasive particles spaced apart from the first layer of abrasive particles and dispersed within the abrasive article according to a second predetermined pattern; and
a binder material retaining the first and second layers of abrasive particles, wherein at least a portion of the binder material located between the first and second layers of abrasive particles is substantially continuous therebetween;
wherein the first layer of abrasive particles comprises at least one of a first plurality of abrasive particles and a second plurality of abrasive particles that is different than the first plurality of particles; and
wherein the first and second layers of abrasive particles are incorporated into the abrasive article free of a scrim layer.

2. The abrasive article of claim 1, wherein the first major surface and the second major surface have a substantially circular profile.

3. The abrasive article of claim 1, further comprising a central aperture extending at least partially between the first and second major surfaces.

4. The abrasive article of claim 3, wherein the central axis extends through the central aperture.

5. The abrasive article of claim 1, optionally further comprising a third layer of abrasive particles adjacent to at least one of the first or second layers of abrasive particles and dispersed within the abrasive article according to a third predetermined pattern.

6. The abrasive article of claim 5, wherein the article is free of a reinforcing layer between adjacent layers of abrasive particles.

7. The abrasive article of claim 5, wherein a portion of a majority of the abrasive particles of the first layer or third layer comprises a portion of the first major surface and wherein a portion of each abrasive particle of the second layer or third layer defines a portion of the second major surface.

8. The abrasive article of claim 5, wherein at least one of the first layer of abrasive particles, the second layer of abrasive particles, and the third layer of abrasive particles ranges from about 2 wt % to about 50 wt % of the abrasive article.

9. The abrasive article of claim 1, wherein the binder material comprises an organic binder, a vitrified binder, or a metallic binder.

\* \* \* \* \*